United States Patent
Han et al.

(10) Patent No.: US 10,057,828 B2
(45) Date of Patent: Aug. 21, 2018

(54) COMMUNICATION SYSTEMS AND METHODS

(71) Applicant: Intel IP Corporation, Santa Clara, CA (US)

(72) Inventors: Seunghee Han, Cupertino, CA (US); Gi Wan Choi, San Jose, CA (US); Hwan-Joon Kwon, Santa Clara, CA (US); Apostolos Papathanassiou, San Jose, CA (US); Jong-Kae Fwu, Sunnyvale, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 39 days.

(21) Appl. No.: 14/697,369

(22) Filed: Apr. 27, 2015

(65) Prior Publication Data

US 2015/0350992 A1    Dec. 3, 2015

Related U.S. Application Data

(60) Provisional application No. 62/006,729, filed on Jun. 2, 2014.

(51) Int. Cl.
*H04W 36/26* (2009.01)
*H04B 7/024* (2017.01)

(52) U.S. Cl.
CPC ........... *H04W 36/26* (2013.01); *H04B 7/024* (2013.01)

(58) Field of Classification Search
CPC ..... H04W 88/06; H04W 72/04; H04W 88/08; H04W 24/02; H04W 16/28; H04W 72/08; H04W 76/02; H04W 88/10; H04W 24/10; H04W 24/08; H04W 36/24; H04W 76/025; H04W 36/0083; H04W 48/18; H04W 4/008; H04W 36/14; H04W 72/0453; H04W 72/042; H04W 72/085;
(Continued)

(56) References Cited

U.S. PATENT DOCUMENTS

2007/0291635 A1    12/2007   Yang et al.
2011/0019776 A1*   1/2011    Zhang ............... H04L 5/0023
                                                   375/340
(Continued)

FOREIGN PATENT DOCUMENTS

WO    2013023290 A1    2/2013

OTHER PUBLICATIONS

Korean Intellectual Property Office; International Search Report and Written Opinion for PCT App. No. PCT/US2015/031513 dated Aug. 31, 2015; 11 pages.

(Continued)

*Primary Examiner* — Paul H Masur
*Assistant Examiner* — Michael K Phillips
(74) *Attorney, Agent, or Firm* — Schwabe, Williamson & Wyatt, P.C.

(57) ABSTRACT

Methods and apparatuses for communicating in a wireless network include a signal processor for combining a plurality of signals transmitted by respective eNBs by processing the signals as multipath instances of a single signal. Embodiments include utilizing multi-point transmissions; multiple transmission time intervals; and transmission time interval bundling/repetition. Other embodiments are also disclosed.

13 Claims, 29 Drawing Sheets

(58) Field of Classification Search
CPC ............. H04W 88/02; H04W 36/0055; H04W 72/046; H04W 36/26
See application file for complete search history.

(56) References Cited

U.S. PATENT DOCUMENTS

| | | | |
|---|---|---|---|
| 2011/0044239 A1* | 2/2011 | Cai | H04W 72/042 370/328 |
| 2011/0310786 A1 | 12/2011 | Qin et al. | |
| 2012/0327904 A1* | 12/2012 | Park | H04L 5/0007 370/331 |
| 2013/0010709 A1 | 1/2013 | Earnshaw et al. | |
| 2013/0155847 A1* | 6/2013 | Li | H04W 24/04 370/225 |
| 2013/0215835 A1 | 8/2013 | Chen et al. | |
| 2013/0286960 A1* | 10/2013 | Li | H04W 72/042 370/329 |
| 2014/0073337 A1* | 3/2014 | Hong | H04W 16/28 455/452.1 |
| 2014/0092809 A1 | 4/2014 | Guo et al. | |
| 2014/0126496 A1* | 5/2014 | Sayana | H04B 7/024 370/329 |
| 2014/0321282 A1* | 10/2014 | Pragada | H04W 36/0072 370/235 |
| 2014/0321375 A1* | 10/2014 | Agiwal | H04W 56/001 370/329 |
| 2015/0003316 A1* | 1/2015 | Kim | H04L 5/0055 370/312 |
| 2015/0004918 A1* | 1/2015 | Wang | H04W 88/02 455/73 |
| 2015/0085680 A1* | 3/2015 | Vrzic | H04L 5/0055 370/252 |
| 2015/0201368 A1* | 7/2015 | Cudak | H04W 48/12 370/329 |
| 2015/0236828 A1* | 8/2015 | Park | H04L 5/0094 375/340 |
| 2016/0192433 A1* | 6/2016 | Deenoo | H04W 72/046 370/329 |
| 2016/0219535 A1* | 7/2016 | Zhang | H04W 72/02 |

OTHER PUBLICATIONS

European Patent Office; Extended European Search Report dated Oct. 24, 2017 for Patent Application No. 15803049.4; 8 pages.

* cited by examiner

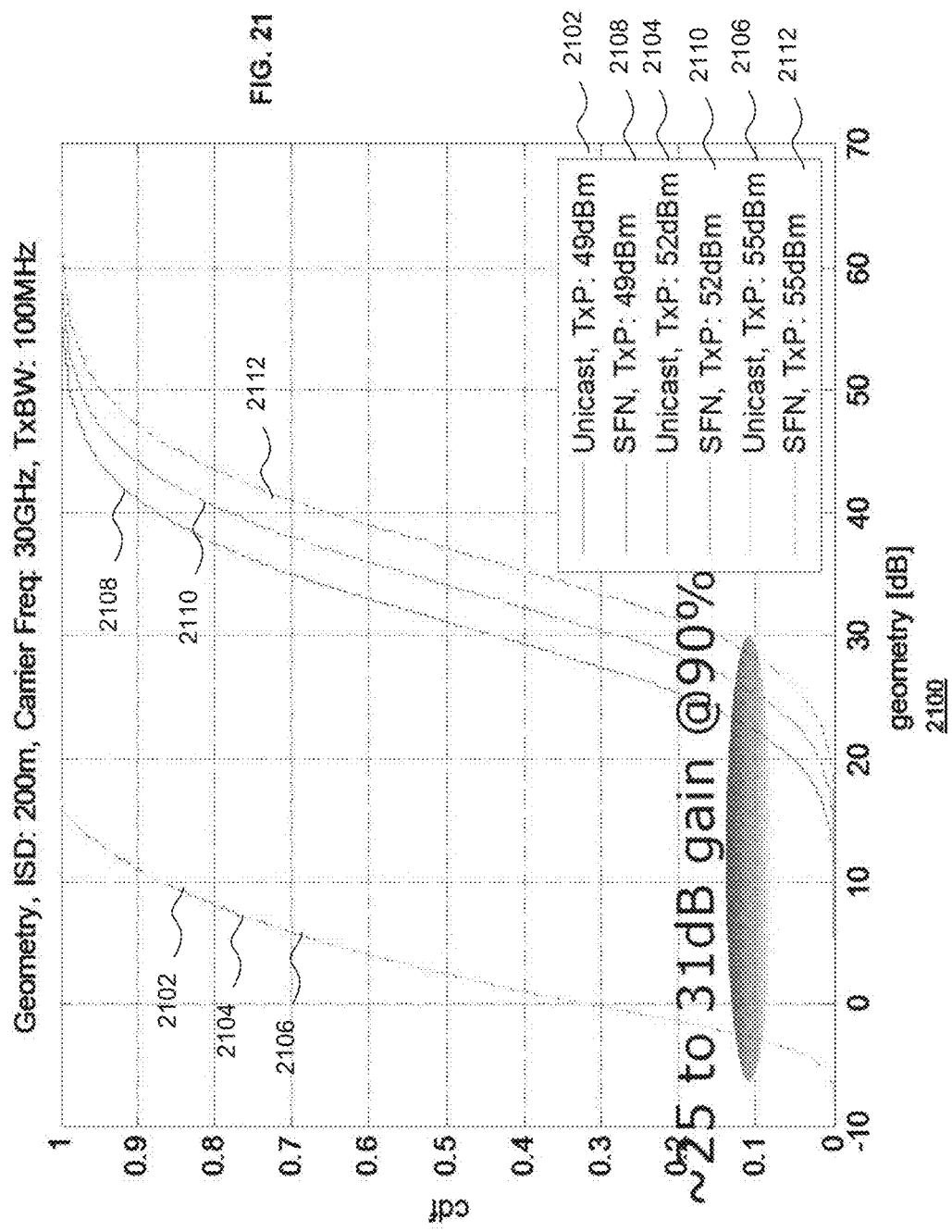

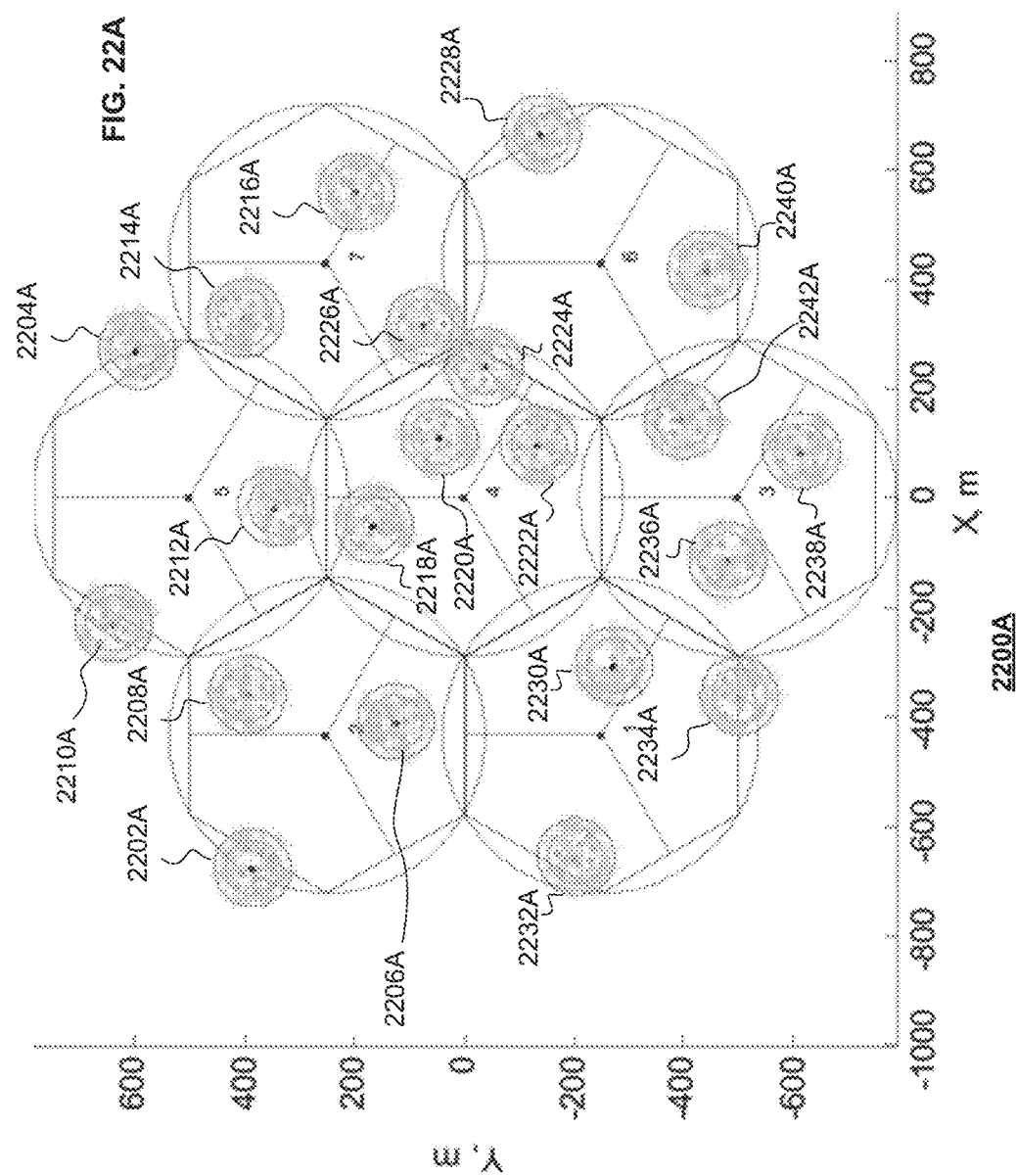

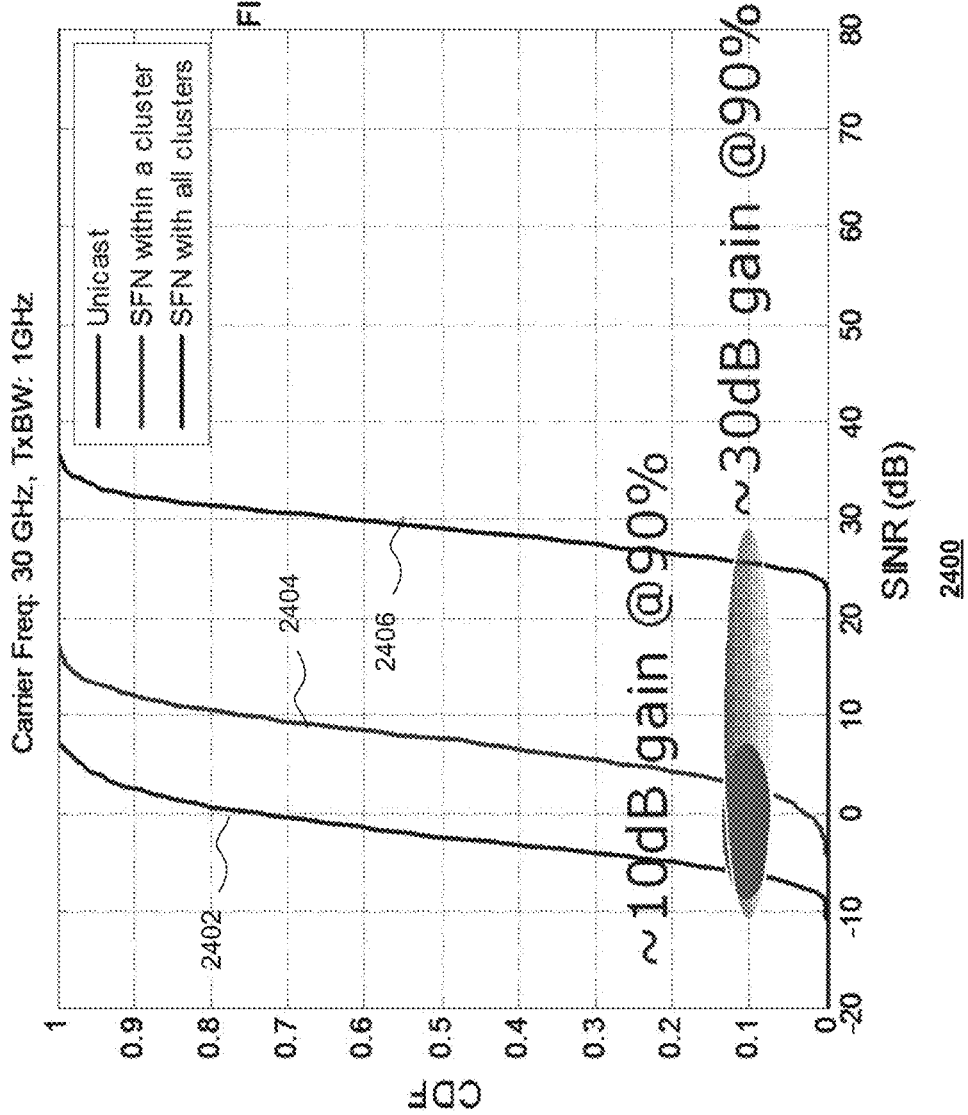

COMMUNICATION SYSTEMS AND METHODS

CROSS REFERENCE TO RELATED APPLICATION

The present application claims priority to U.S. Provisional Patent Application No. 62/006,729, filed Jun. 2, 2014, entitled "[5G] METHODS FOR IMPROVING COVERAGE IN HIGHER CARRIER FREQUENCY", the entire disclosure of which is hereby incorporated by reference.

BACKGROUND

The development of the next generation of wireless mobile communications for 5G cellular communication is underway. With spectrum always being at a premium, engineers are turning to millimeter wave frequencies to provide those next generation services. Millimeter wave frequencies are found at 30 to 300 GHz. There is also considerable interest in using frequencies from and above 28 GHz.

However, while the above spectrum is presently unused for LTE as licensed spectrum such that it could be used to realise multi-gigabit wireless communication, it is well-known within the art that electromagnetic waves at these frequencies suffer from high attenuation and high path loss, which, consequently, limits the cell sizes that can be realised.

Various techniques exist for addressing path loss, which include using a diversity technique, such as, for example, spatial diversity/multiplexing, in which two or more different transmit signals are used to increase overall throughput, and beam forming, in which two or more instances of the same signal are used to improve communication reliability.

Nevertheless, millimeter waves present several beam forming technical challenges that comprise, firstly, delay spread and angular spread, which are particularly problematical under Non-Line Of Sight (NLOS) conditions such as found indoors, and, secondly, beam misalignment, which arises when channel state information or beam tracking is inaccurate due to, for example, at least one or more of measurement errors and user equipment mobility.

BRIEF DESCRIPTION OF THE DRAWINGS

Aspects, features and advantages of embodiments of the present invention will become apparent from the following description given in reference to the appended drawings in which like numerals denote like elements and in which:

FIG. 21 shows geometry curves for a still further simulation at GHz frequencies;
FIGS. 22A and 22B illustrate a small cell deployment scenario;
FIG. 24 depicts geometry curves for still another simulation at GHz frequencies.

DETAILED DESCRIPTION

Figure 1:
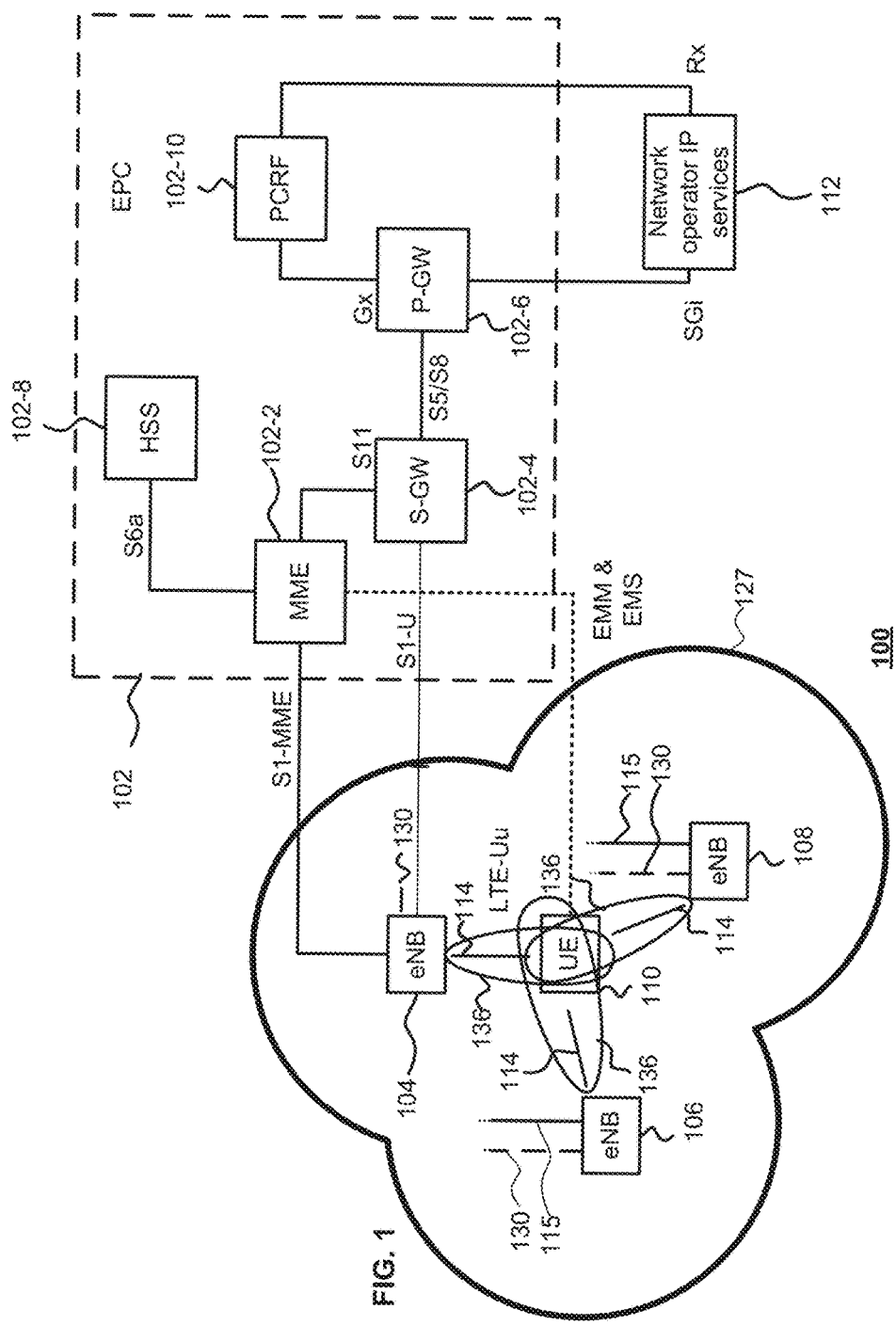
FIG. 1 shows a communication system.

FIG. 1 shows a communication system such as, for example, an Evolved Packet System (EPS) 100. The EPS 100 comprises an Evolved Packet Core (EPC) 102, a number of eNodeBs (eNBs) 104 to 108, a user equipment (UE) 110 and an operator packet data network 112.

The EPC 102 has a mobile management entity (MME) 102-2. The EPC 102 also comprises a serving gateway (S-GW) 102-4 and a packet data network gateway (P-GW) 102-6. The S-GW 102-4 is operable to exchange packets with one or more of the eNBs 104 to 108 that are serving the UE 110. The S-GW 102-4 operates in effect as a router supporting data exchange between the UE 110 and the P-GW 102-6. The P-GW 102-6 serves as a gateway to external packet data networks such as, for example, the network 112. The P-GW 102-6 also performs other functions such as address allocation, policy enforcement, packet filtering and routing. It can be appreciated that the packet data network gateway 102-6 communicates with the external packet data network 112 via an SGi interface.

The MME 102-2 performs signaling such that data packets do not pass through the MME 102-2, which decouples data from signaling to support developing capacity for signaling and data separately. The MME 102-2 is operable to control many aspects of UE 110 engagement such as, for example, paging the UE 110, tracking area management, authentication, gateway selection, roaming, security and the like.

The eNBs 104 to 108 are responsible for providing the air interface, LTE-Uu, via which the UE 110 can transmit and receive packets. The eNBs 104 to 108 perform various functions such as, for example, admission control to allow the UE 110 access to the EPC 102 and radio resource management.

The eNBs 104 to 108 and the MME 102-2 communicate via an S1-MME interface. Optionally, and not shown, the eNBs 104 to 108 can be connected to one another or to one or more other eNBs either directly via an X2 interface or indirectly via the S1-MME interface.

The eNBs 104 to 108 are an embodiment of a set of base stations. Such a set of base stations can comprise one or more than one base station. An eNB serving the UE 110 is said to be an active base station. Therefore, the eNBs 104 to 108 can form an embodiment of a set of active base stations. Such a set of active base stations can comprise one or more than one active base station. Conversely, if one or more than one eNB of the eNBs 104 to 108 was not serving the UE 110, or any other UE, it would be said to be an inactive base station so that a group of such inactive eNBs would be an embodiment of a set of inactive base stations. Such a set of inactive base stations can comprise one or more than one inactive base station. Typically, a network, such as a mobile network, has a set of base stations comprising a set of active base stations and a set of inactive base stations. One skilled in the art understands that an eNB can be a species of the genus "base station" and that embodiments of the present invention can be implemented or realised using one or more than one base station.

The EPC 102 can comprise a home subscriber server (HSS) 102-8. The HSS 102-8 is a centrally accessible database containing subscriber data associated with one or more than one UE such as, for example, the UE 110.

One skilled in the art appreciates that the various interfaces described above are implemented to exchange data between the UE 110 and the P-GW 102-6 using user plane protocols such as, for example, GPRS tunneling protocol user part (GTP-U), and, for example, Generic Routing Encapsulation (GRE); the latter can be used to realise an S5/S8 interface between the S-GW 102-4 and the P-GW 102-6.

The EPS 100 uses a plurality of signaling protocols. Air interface signaling, via which the eNBs 104 to 108 influence or otherwise control the radio resources used by the UE 110, is realised using a radio resource control (RRC) protocol. The S1-MME link or interface is realised using the S1 application protocol (S1-AP).

The MME 102-2 controls the UE 110 using two air interface non-access stratum protocols, which are the EPS session management (ESM) protocol, which controls data streams associated with the external packet data network 108, and the EPS mobility management (EMM) protocol, which manages the internal operation of the EPC 102. EMM and EMS messages are exchanged with the UE 110 using RRC and S1-AP messages using the S1-MME and LTE-Uu interfaces.

The S11 interface signaling and the S5/S8 interface signaling are implemented using the GPRS tunneling protocol control part (GTP-C).

The EPC 102 can also comprise a Policy Control Rule Function (PCRF) network entity 102-10. The PCRF 102-10 is responsible for establishing a number of performance objectives. Examples of the performance objectives can comprise at least one of quality of service (QoS) and charging goals for each session based on a respective or committed service level per UE and service type.

Figure 2:
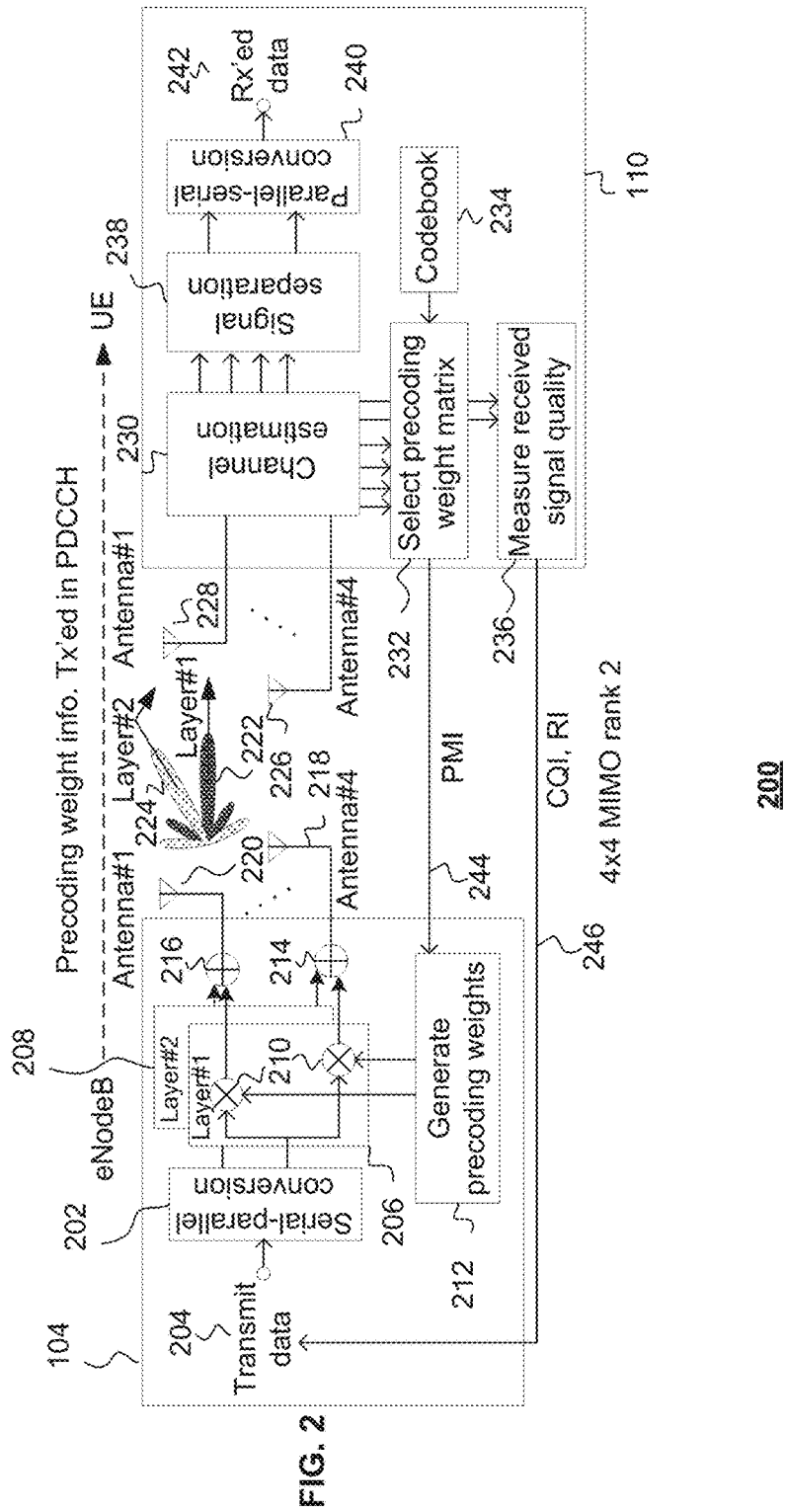
FIG. 2 illustrates eNB-UE beam forming.

FIG. 2 shows, in greater detail, a view 200 of one eNB 104 of the above eNBs 104 to 108 communicating with the user equipment 110. The eNB 104 and the user equipment 110 can be configured to communicate using beam forming. In the example depicted, the eNB 104 is arranged to output at least one beam formed transmission, that is, the eNB directs radio energy to the user equipment 110. The eNB 104 comprises a serial to parallel converter 202 configured to convert transmit data 204 to at least one layer for transmission. In the illustrated embodiment, two layers 206 and 208 are shown, that is, layer#1 206 and layer#2 208. The layers 206 and 208 are formed by mixing, using a pair of mixers 210, precoding weights, supplied by a precoding weights generator 212. The outputs of the layers 206 and 208 are supplied to respective adders 214 and 216. The outputs from the adders 214 and 216 are transmitted to the user equipment 110 via one or more than one antenna of the eNB 104; namely, a plurality of antennas 218 and 220. In the embodiment described, four such antennas are used. The precoding weights result in one or more than one formed beam. In the example shown, two beam patterns 222 and 224 are formed.

Referring to the user equipment 110, it can be seen that it comprises one or more than one antenna. In the illustrated embodiment, a plurality of antennas is provided. More particularly, four antennas are provided; only two 226 and 228 of which are shown. The antennas 226 and 228 receive one or more of the transmit beams 222 and 224. A channel estimator 230 is configured to process signals received by the antennas 226 and 228. The channel estimator 230 is configured to produce channel data associated with an estimate of one or more than one channel between the eNB 104 and the user equipment 110. The channel data is output to a precoding weight matrix selector 232. The precoding weight matrix selector 232 is responsive to a codebook 234 to provide a Precoding Matrix Indicator (PMI) to the eNB 104, in particular, to provide the PMI to the precoding weights generator 212.

Still referring to FIG. 2, the channel estimator 230 forwards the received signals to a signal separator 238. The signal separator 238 is configured to separate the received signals into respective parallel data streams. The parallel data streams are processed by a parallel to serial converter 240 configured to output the received data 242.

The channel data from the channel estimator 230 is also output to a module 236 configured to provide data associated with received signal quality. The data associated with received signal quality is provided in a closed-loop feedback manner to the eNB for comparison with the transmitted data. In the embodiment illustrated, the data can comprise at least one of, and preferably both of, a Channel Quality Indicator (CQI) 244 and a Rank Indicator (RI) 246. The eNB 104 uses the CQI, RI, and PMI to adaptively control the number of layers transmitted to the user equipment 110.

One skilled in the art will appreciate that the eNB 104 and the UE 110 are configured to communicate using 4×4 MIMO with a Rank 2, that is, both layers are destined for the user equipment 110. The precoding weights selected by the precoding weights generator 212 are communicated to the user equipment 110 via a communication channel such as, for example, the Physical Downlink Control Channel (PDCCH) of LTE-A.

Figure 3:
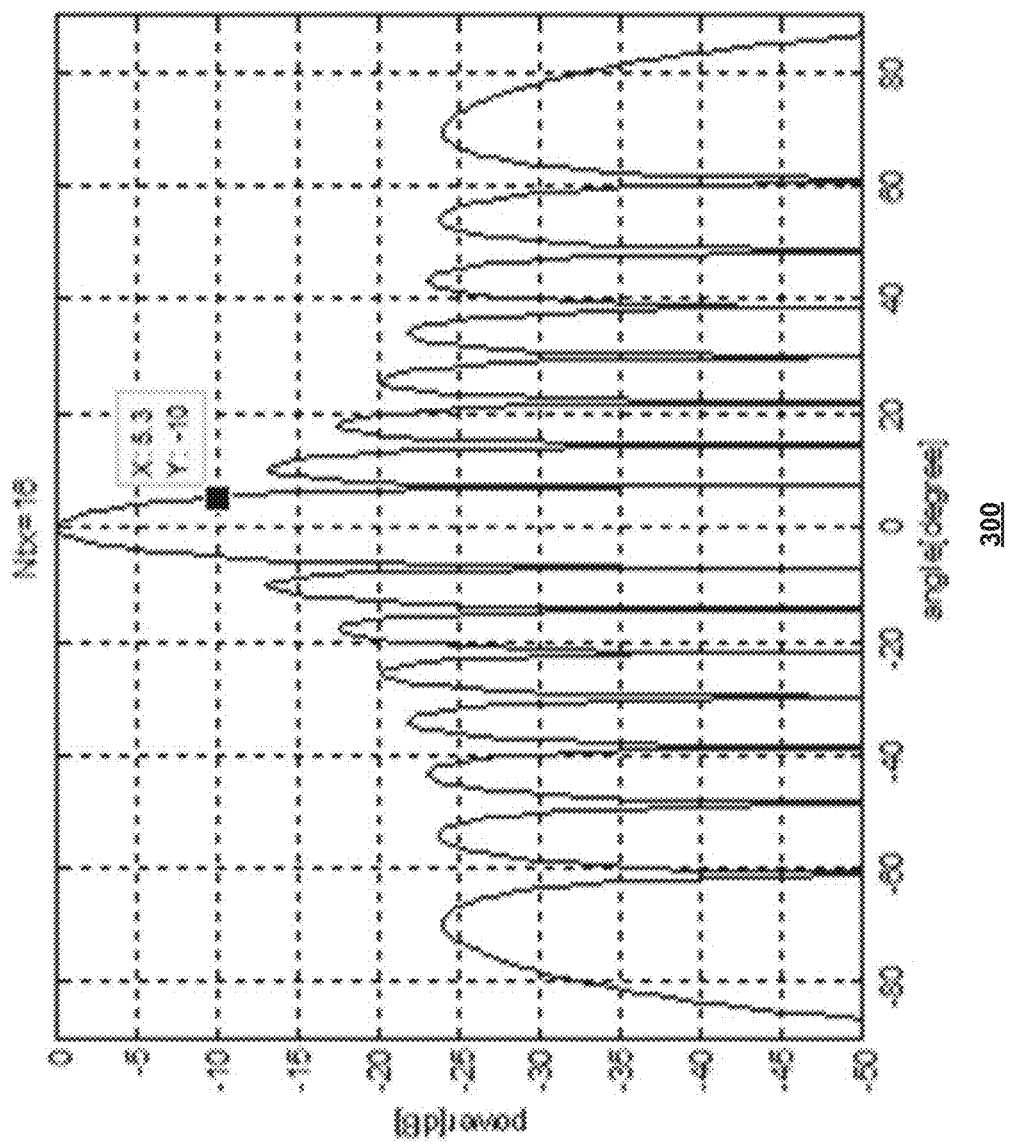
FIG. 3 depicts variation of beam pattern with beam angle.

Referring to FIG. 3, there is shown a graph 300 of the variation of beam pattern transmit power, plotted as the ordinate, with beam angle, plotted as the abscissa, for a system having 16 transmit antennas. It can be appreciated that a misalignment of, for example, only 5.3 degrees results in a significant loss of 10 dB. For a system using 128 transmit antennas, the same 10 dB loss results from a mere 0.66 degree beam misalignment. Such a misalignment can result in the above-mentioned anomalies, in particular, the effectiveness of beam forming can be, at best, undermined, and, at worst, rendered ineffective entirely, which can be particularly problematical during at least one or more of initial power-up, time and/or frequency synchronisation and network attachment. The adverse consequences of the foregoing are made more emphatic when the system operates at least one of indoors, especially under NLOS conditions, and at higher frequencies such as, for example, the above millimeter wave frequencies.

The eNB 104 is arranged to transmit one or more than one of a pair of downlink synchronisation signals, which are the Primary Synchronisation Signal (PSS) and the Secondary Synchronisation Signal (SSS). This applies to both Frequency Division Duplex (FDD) and Time Division Duplex (TDD). The synchronisation signals are broadcast periodically, or at prescribed times. Embodiments can be realised that broadcast at least one or both of the PSS and SSS in every 10 ms radio frame. The UE 110 uses the synchronisation signals to achieve radio frame, subframe, slot and symbol synchronisation in the time domain, to identify the centre of the channel bandwidth in the frequency domain and to determine the Physical layer Cell Identity (PCI). It will be appreciated that detecting and processing at least one of the synchronisation signals is a prerequisite to measuring the Cell Specific Reference signals (CSI-RS) and decoding the Master Information Block (MIB) on the Physical Broadcast Channel (PBCH).

The UE 110 obtains system information to be able to communicate with one or more than one eNB of the eNBs 104 to 108. The system information is carried by the MIB and one or more than one System Information Block (SIB). The MIB conveys the system bandwidth, the System Frame Number (SFN) and the Physical Hybrid Automatic Repeat Request (HARQ) Indicator Channel (PHICH) Configuration.

The MIB is carried on the Broadcast Channel (BCH), which is, in turn, mapped into the Physical Broadcast Channel (PBCH). The PBCH is transmitted with a fixed coding and modulation scheme and can be decoded after an initial cell search procedure. Once the UE 110 has the MIB, the UE 110 is able to decode the Control Format Indicator (CFI). The CFI provides an indication of the Physical Downlink Control Channel (PDCCH) length, which allows the PDCCH to be decoded. The presence in the PDCCH of a Downlink Control Information (DCI) message scrambled with a System Information Radio Network Temporary Identifier (SI-RNTI) indicates that a SIB is carried in the same subframe. The SIB is transmitted in the Broadcast Control Channel (BCCH) logical channel. One skilled in the art will appreciate that BCCH messages can be carried on the Downlink Shared Channel (DL-SCH) and can be transmitted on the Physical Downlink Shared Channel (PDSCH). The format and resource allocation of the PDSCH transmission is indicated by a DCI message on the PDCCH.

The UE 110, having achieved synchronisation and being in a position to receive the MIB and SIB, can commence the Random Access Channel procedure. A Random Access Channel (RACH) is an uplink transmission that is used UE 110 to initiate synchronization with one or more than one eNB 104 of the eNBs 104 to 108.

Figure 4A:
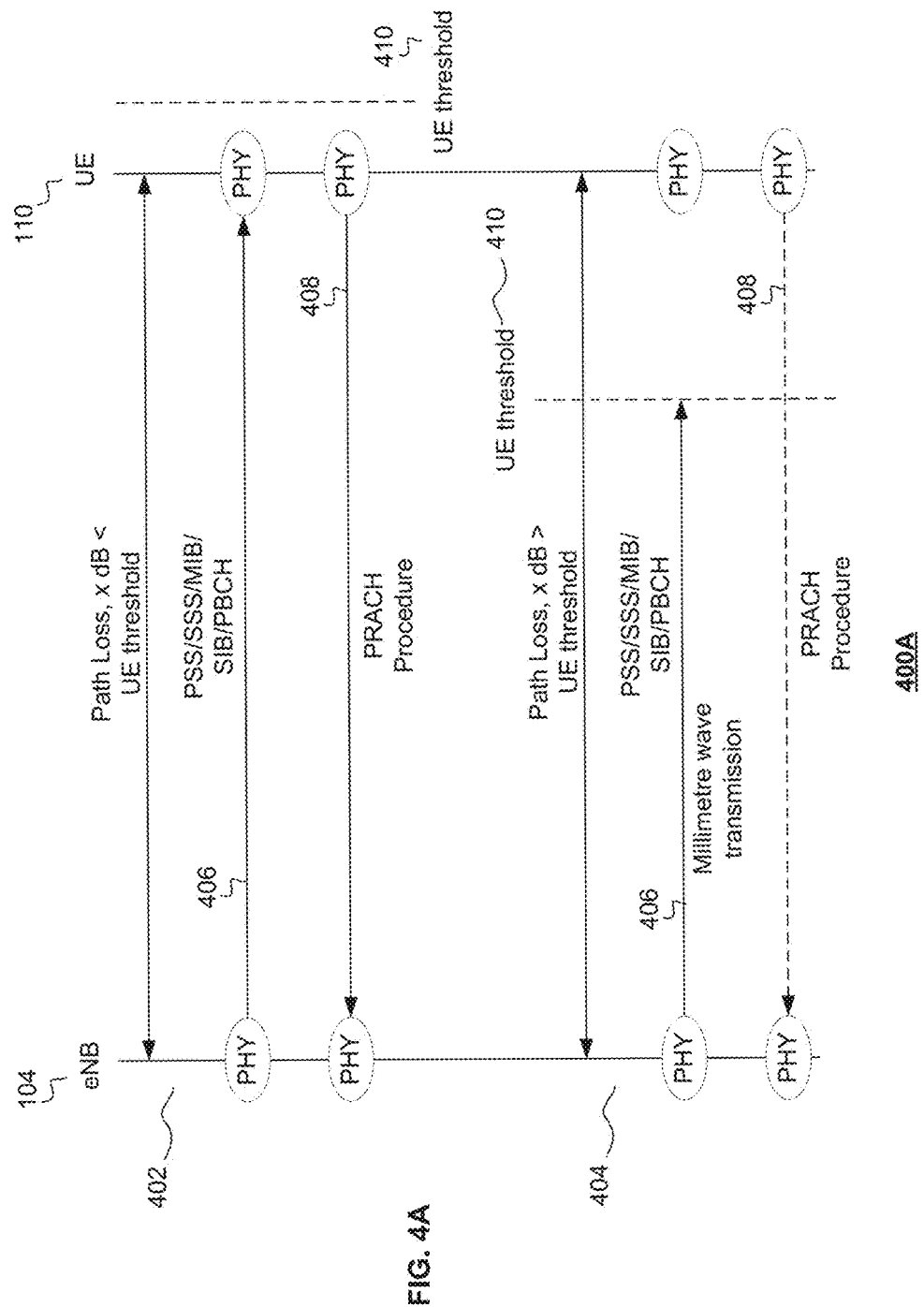
FIG. 4A shows a contrast between transmitting two synchronization signals at different frequencies.

Referring to FIG. 4A, there is shown a view 400A of the contrast between transmitting the PSS and SSS using current LTE frequencies 402 and transmitting the same signals at millimeter wave frequencies 404.

In the first instance 402, the eNB 104 transmits one or more of the PSS and SSS 406 to the UE 110. It can be appreciated that the transmit power, path losses etc. are such that the synchronisation signals can be received by the UE 110 notwithstanding the path loss, x dB. The receive threshold of the UE 110 is less than the transmit power minus the path loss, x dB, which results in a signal having sufficient power to be able to be detected by the UE 110.

Having received the synchronisation signals PSS and SSS 406, the PBCH can be received and the MIB and SIB can be recovered, which, in turn, allows the UE 110 to initiate synchronisation with the eNB 104 and commence the PRACH procedure 408. The path loss can include many contributing factors such as, for example, at least one of the above attenuation, NLOS, beam pattern offset and the like.

However, in the second instance 404, the eNB 104 transmits one or more of the PSS and SSS 406 to the UE 110. It can be appreciated that the transmit power, path losses etc. are such that the synchronisation signals cannot be received by the UE 110 because the path loss, x dB, results in a signal strength that is less than the receive threshold 410 of the UE 110, that is, the transmit power minus the path loss results in a signal with insufficient power to be detected by the UE 110.

Having failed to receive the synchronisation signals PSS and SSS 406, the PBCH cannot be received and the MIB and SIB cannot be recovered, which, in turn, prevents the UE 110 from initiating synchronisation with the eNB 104 and prevents the eNB 104 from starting the PRACH procedure 408, as depicted by the dashed line. The path loss includes many aspects comprising at least one of the above attenuation, NLOS, beam pattern offset and the like.

As indicated above, various techniques or transmission modes exist to mitigate the effects of adverse channel conditions. LTE release 10 has a number of different transmission modes. Transmissions using millimeter wave transmissions can be particularly problematical under beam forming conditions. Beam forming, e.g., corresponds to transmission modes 7, 8, 9, or 10. Therefore, when channel conditions are such that beam forming cannot, or can no longer be, accommodated, embodiments can be realised that switch from a current transmission mode of a user equipment to a transmission mode according to an embodiment such as, for example, a transmission mode described with reference to the embodiments below.

Figure 4B:
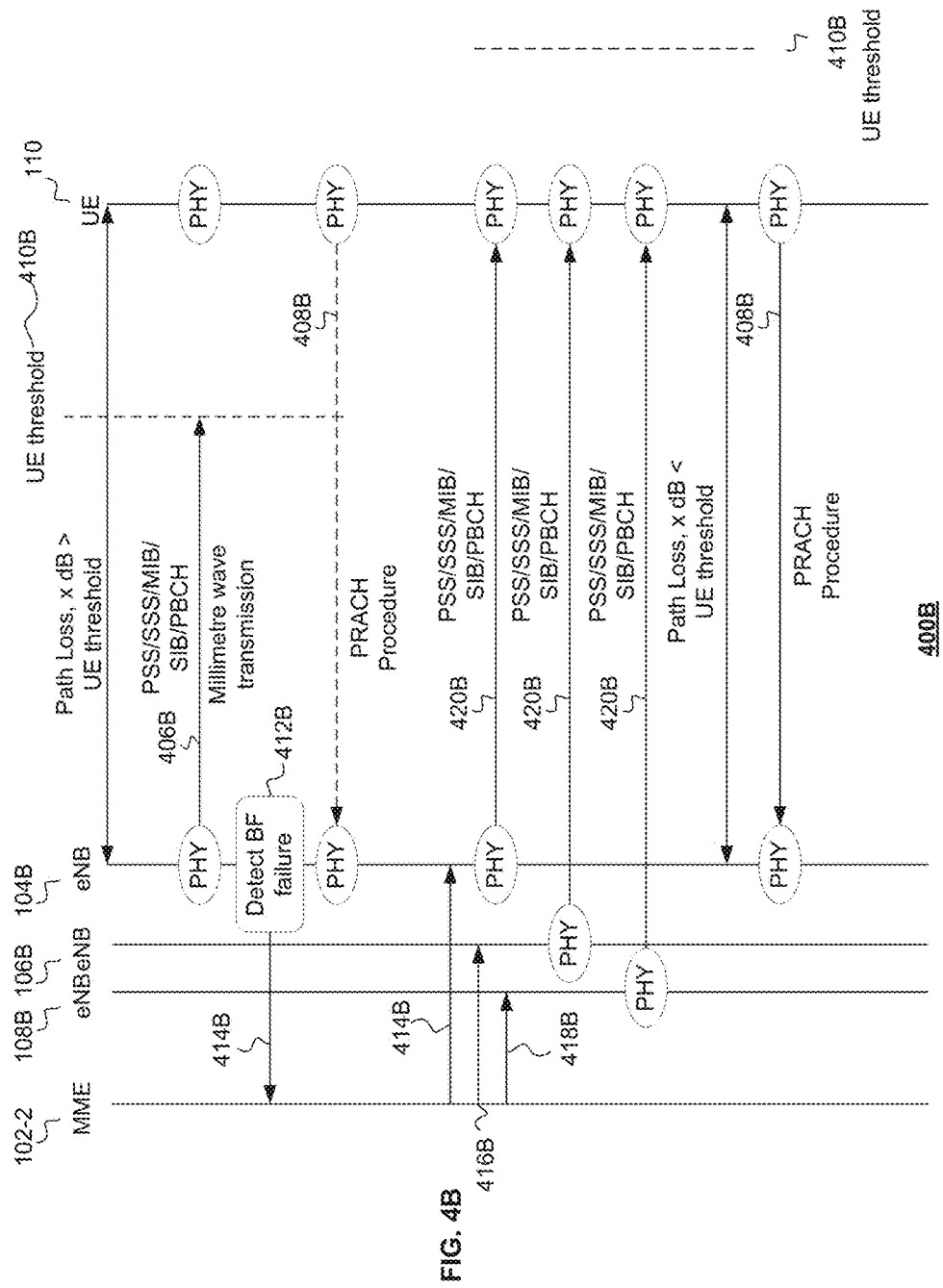
FIG. 4B shows signalling according to an embodiment.

Referring to FIG. 4B, there is shown a view 400B of mode switching according to an embodiment.

It can be appreciated that an eNB 104B transmits one or more of PSS and SSS synchronisation signals 406B to the UE 110. It can be appreciated that the transmit power, path losses, beam pattern etc. are such that the synchronisation signals cannot be received by the UE 110 because the path loss, x dB, results in a signal strength that is less than the receive threshold 410B of the UE 110, that is, the transmit power minus the path loss results in a signal with insufficient power to be detected by the UE 110.

Having failed to receive the synchronisation signals PSS and SSS 406B, the PBCH cannot be received and the MIB and SIB cannot be recovered, which, in turn, prevents the UE 110 from initiating synchronisation with the eNB 104B and prevents the eNB 104B from starting the PRACH procedure 408B, as depicted by the dashed line. The path loss includes many aspects comprising at least one of the above attenuation, NLOS, beam pattern offset and the like.

The originating eNB 104B detects such a failure, such as a failure of beam forming, or a failure of some other transmission mode at 412B and forwards a message or other signal 414B to that effect to the MME 102-2.

The MME 102-2, in response to determining that the current transmission mode of the eNB 104 has failed, instructs, at 416B to 418B, a plurality of eNBs to switch to a transmission mode according to an embodiment. In the illustrated example, it can be appreciated that the MME 102-2 instructs three eNBs 104B to 108B to switch to a transmission mode according to an embodiment in which each of the plurality of eNBs 104B to 108B transmits the same signal 420B to the user equipment 110. In particular, each eNB 104B to 108B of the plurality of eNBs transmits the same signal to the user equipment using the same resource elements at the same time.

The user equipment 110 processes the signals 420B as multipath instances of the same signal, which results in the combined signal having a signal strength that is greater than the receive threshold 410B of the user equipment.

It can be appreciated that the MME 102-2 instructs the plurality of eNBs 104B to 108B to serve the user equipment by transmitting the same PBCH, MIB, SIB, or any channels on control plane to the user equipment, preferably using the same resource elements at the same time. Therefore, having received the synchronisation signals PSS and SSS 406B, the PBCH can be received and the MIB and SIB can be recovered, which, in turn, allows the UE 110 to initiate synchronisation with the eNB 104B and commence the PRACH procedure 408B with at least one of eNB of the plurality of eNBs. During this transmission mode, the plurality of eNBs 104B to 108B continues to engage with the user equipment as if they were the sole eNB serving the user equipment. The plurality of eNBs will transmit the same signals to the user equipment using the same resource elements at the same time.

Therefore, communications with the user equipment can be supported even in environments, or under conditions, in which the transmissions use millimeter waves and/or in which one or more than one other transmission mode of the user equipment fails because the user equipments treats the signals from the plurality of eNBs as multipath instances of the same signal.

Although the embodiment described with reference to FIG. 4B demonstrates switching from a beam forming mode to a diversity mode such as, for example, a Single Frequency Network (SFN) mode according to an embodiment, embodiments are not limited thereto. Embodiments can be realised in which the MME 102-2 instructs the eNBs to switch to using the diversity mode according to embodiments from other transmission modes.

Figure 5A:
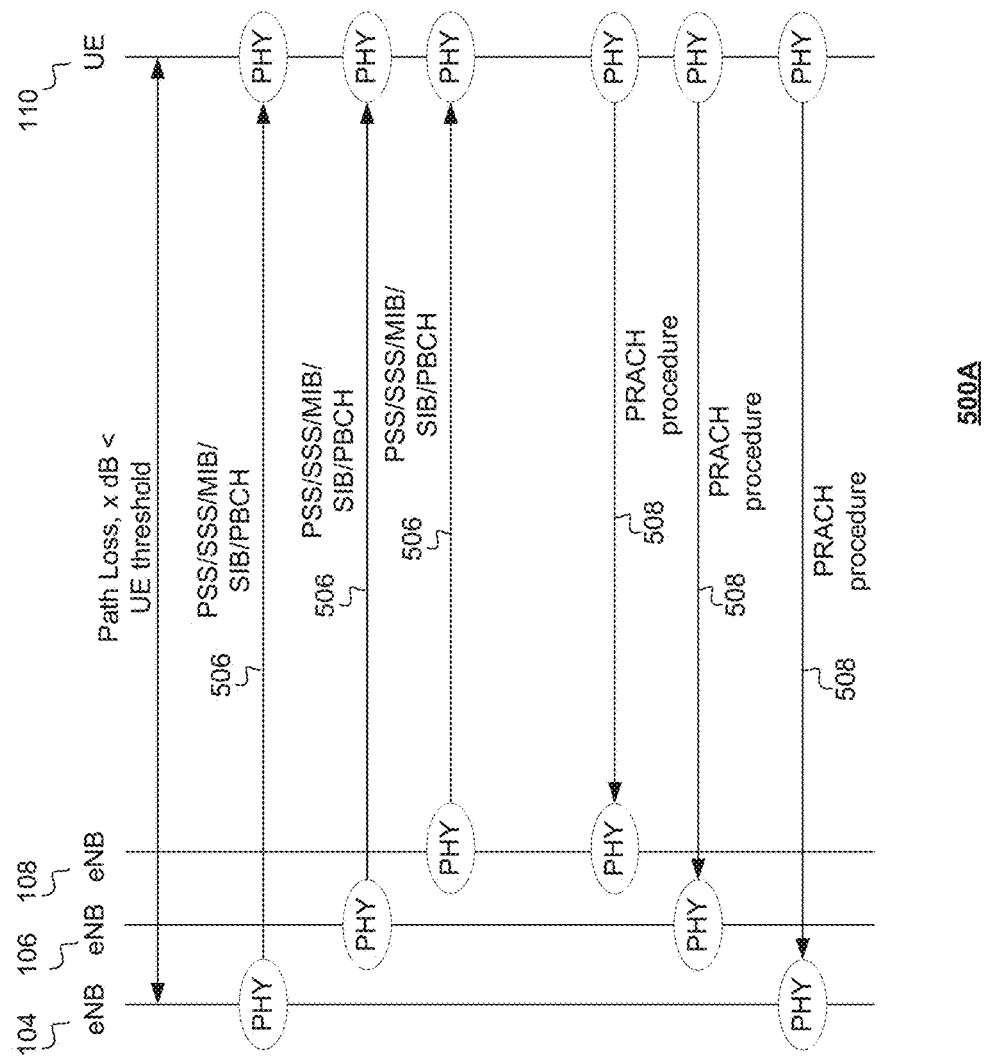
FIG. 5A shows transmission of synchronization signals at microwave frequencies according to an embodiment.

Referring to FIG. 5A, there is shown a view 500A of transmitting one or more than one signal such as, for example, the PSS and SSS, using frequencies other than current LTE frequencies such as, for example, transmitting at millimeter wave frequencies.

It can be appreciated that a plurality of eNBs of the eNBs 104 to 108 transmits one or more of the PSS and SSS 506 to the UE 110. In the embodiment illustrated, it can be seen that three of the eNBs 104 to 108 are transmitting the synchronisation signals. Although the embodiment has been illustrated as the plurality of eNBs comprising three eNBs, embodiments are not limited thereto. Embodiments can be realised in which the plurality of eNBs comprises two or more eNBs transmitting the signals in a manner that renders them as ostensibly multipath signals, that is, they are transmitted using the same radio resources at the same time.

The UE 110 processes the PSS and SSS signals received from the plurality of eNBs as multipath instances of the same signal, which allows the UE 110 to receive and recover the PSS and the SSS signals. Therefore, it can be appreciated that the transmit power, path losses etc. are such that the synchronisation signals can be received by the UE 110 notwithstanding the signals, due to path loss, x dB, being less than the receive threshold of the UE 110, that is, the transmit power minus the path loss still results in an overall signal having sufficient power to be detected by the UE 110 and notwithstanding the transmit frequencies being, for example, millimeter wave frequencies.

It will be appreciated that in free space path loss, PL($f_c$, R), varies with carrier frequency and distance according to $$PL(f_c,R)=92.4+20\ \log_{10}(f_c[\text{GHz}])+20\ \log_{10}(R[\text{km}])$$

where $f_c$ is the carrier frequency in GHz and R is the cell radius in km. Therefore, higher carrier frequencies result in higher path losses. For example, the difference in free space path loss between a 2 GHz carrier and a 30 GHz carrier is significant and is approximately 23.52 dB. Therefore, to provide the same geographical coverage, a gain of 23.52 dB would be needed in the 30 GHz carrier case.

Having received the one or more than one signal such as, for example, the synchronisation signals PSS and SSS 506, the PBCH can be received and the MIB and SIB can be recovered, which, in turn, allows the UE 110 to initiate synchronisation with one or more than one of the plurality of eNBs transmitting the PSS and SSS via the PRACH procedure 508. The path loss includes many aspects comprising at least one of above attenuation, NLOS, beam pattern offset and the like.

It can be appreciated that the plurality of eNBs transmitting the same signals operates, in effect, as a Single Frequency Network (SFN).

Although the embodiments described herein refer to the PSS and SSS signals as being used for initial synchronisation and access to the eNBs, embodiments are not limited thereto. Embodiments can be realised in which some other synchronisation signal or signals or some other access signal or signals can be transmitted by the plurality of eNBs to the UE 110 for multipath processing by the UE 110.

Therefore, embodiments can be realised in which initial access of the UE 110 to the network 102 is facilitated by transmitting multiple instances of the same signal to the UE 110 via respective eNBs 104 to 108.

Embodiments can be realised that are responsive to changing channel conditions. Therefore, if an eNB of the eNBs 104 to 108 determines that beam forming is ineffective, that eNB informs the MME, which can arrange for at least two or more of the eNBs 104 to 108 to transmit the same signals or data to the user equipment 110 at the same time using the same radio resources. The eNBs 104 to 108 selected for transmitting the same signals or data to the user equipment 110 are those eNBs 104 to 108 that encompass the user equipment 110 within their areas of coverage. Overlapping regions of coverage, which are ordinarily avoided, are used to improve communications with the user equipment 110. Signals from notionally interfering eNBs are coordinated, that is, the same signals are transmitted at the same time using the same resources such that from the perspective of the user equipment 110 the multiple instances of the same signal appear to be, or are treated as, multipath instances of a single signal.

It can be appreciated that eNBs 104 to 108 operating in such a coordinated manner establish a Single Frequency Network (SFN). One skilled in the art will appreciate that although the eNBs 104 to 108 are shown as using beam forming, embodiments can equally well be realised in which beam forming is not used.

By receiving multiple instances of the same signal transmitted at the same time using the same radio resources, the initial access of the user equipment 110 to the network 102 can be made more reliable.

In taking action to mitigate the effects of apparent multipath anomalies, embodiments can use any type of cyclic prefix (such as, for example, a normal cyclic prefix or an extended cyclic prefix) depending upon, for example, the separation of the eNBs 104 to 108 or depending upon one or more than one respective channel or one or more than one of the signals. For greater separation between the eNBs 104 to 108, a longer cyclic prefix such as, for example, an extended cyclic prefix should be used. Embodiments can be realised in which the cyclic prefix is selected according to the separation between the eNB 104 to 108, that is, according to the perceived severity of the ostensible multipath anomalies.

The user equipment 110 can be arranged to transmit a reference signal or symbol, such as, for example, a Sounding Reference Signal (SRS), to allow the eNBs 104 to 108 to perform channel specific or channel dependent scheduling. Typically, the user equipment 110 transmits such a reference signal within the last symbol of a time slot. The reference signal can be a common SRS or a dedicated SRS.

Each eNB 104 to 108 is configured to determine the respective channel conditions to the user equipment and to inform the MME 102-2 accordingly so that the MME 102-2 can determine, control or at least coordinate the transmissions intended for the user equipment 110 to allow it to benefit from the received multiple instances of the same signal transmitted by the eNBs 104 to 108 at the same time using the same radio resources. The eNBs 104 to 108 use the data associated with the channel conditions to determine uplink channel weightings as indicated above with respect to FIG. 2. It will be appreciated that for TDD mode, since the uplink and downlink use the same carrier, the uplink weights can be used as downlink weights for beam forming.

Although in general precoding is used in multi-stream beam forming such beam forming, as indicated above, can be ineffective. In more general terms, it is considered to be spatial processing that occurs at the transmitter. In (single-layer) beam forming, the same signal is emitted from each of the transmit antennas with appropriate phase (and sometimes gain) weighting such that the signal power is maximized at the receiver input. The benefits of beamforming are to increase the received signal gain, by making signals emitted from different antennas add up constructively, and to reduce the multipath fading effect. When the receiver has multiple antennas, the transmit beam forming cannot simultaneously maximize the signal level at all of the receive antennas, and precoding with multiple streams is used. Note that precoding generally requires knowledge of channel state information (CSI) at the transmitter as indicated above. Therefore, embodiments can be realised with or without beam forming according to whether or not beam forming is constructive or detrimental.

In various embodiments, the UE 110 and/or the eNBs 104, 106 and 108 may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE 110 may provide some type of channel state information (CSI) feedback to the eNBs 104, 106, and 108 via one or more up link channels, and the eNBs 104, 106 and 108 may adjust one or more down link channels based on the received CSI feedback. The feedback accuracy of the CSI may affect the performance of the MIMO system. However, embodiments can be particularly effective at millimeter wave frequencies without beam forming.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

As indicated above, in various embodiments, the UE 110 may transmit CSI feedback to the eNBs 104, 106, 108 when that information is available. The CSI feedback may include information related to channel quality index (CQI), precoding matrix indicator (PMI), and rank indication (RI). PMI may reference, or otherwise uniquely identify, a precoder within the codebook. The eNBs 104, 106, 108 may adjust their downlink channels based on the precoder referenced by the PMI.

Therefore, one or more than one eNB 104, 106, 108 can be configured to use directed radio energy when communicating with the user equipment 110. In the illustrated embodiment, beams 136 are formed by the eNBs 104, 106, 108 to focus the radio energy towards the user equipment 110. One skilled in the art appreciates that the beams 136 overlap to define, at least part of, the areas of radio coverage or to define, at least part of, the SFN area 127.

Figure 5B:
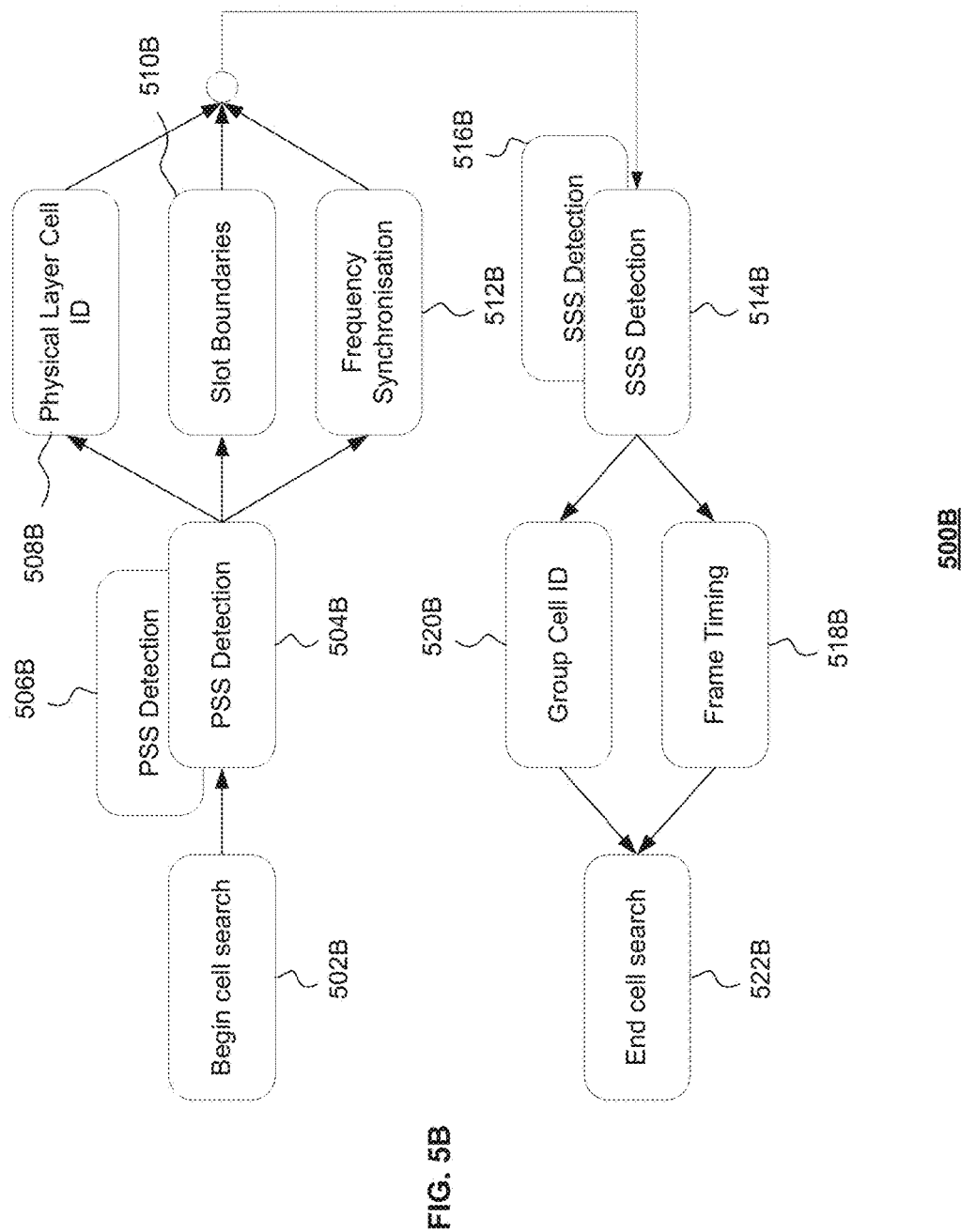
FIG. 5B depicts a cell search procedure according to an embodiment.

Referring to FIG. 5B, there is shown a cell search procedure 500B according to an embodiment, which commences at 502B. The UE 110 attempts to detect a plurality of signals 504B to 506B such as, for example, synchronization signals. Each of the signals use the same resource elements and are arranged to be transmitted at the same time by respective, separate, eNBs of a plurality of eNBs such as the three eNBs 104 to 108 described above. It will be appreciated that the plurality of signals has been shown as comprising two instances of the same PSS signal for reasons of clarity and illustration. Embodiments can be realised in which two or more than two signals are transmitted by respective eNBs. The UE 110 receives the plurality of PSS signals and processes them as if they were multipath instances of the same signal. The PSS signals are used to derive the Physical Layer Cell ID 508B, the slot boundaries 510B and time and frequency synchronization 512B.

Thereafter, the UE 110 commences detecting a plurality of SSS signals 514B and 516B; each SSS signal being transmitted by a respective eNB of the plurality of eNBs 104 to 108 using the same resource elements at the same time. The plurality of SSS signals allows the UE 110 to recover the frame timing 518B and the Group Cell ID 520B. Thereafter, the cell search procedure ends at 522B.

Figure 6A:
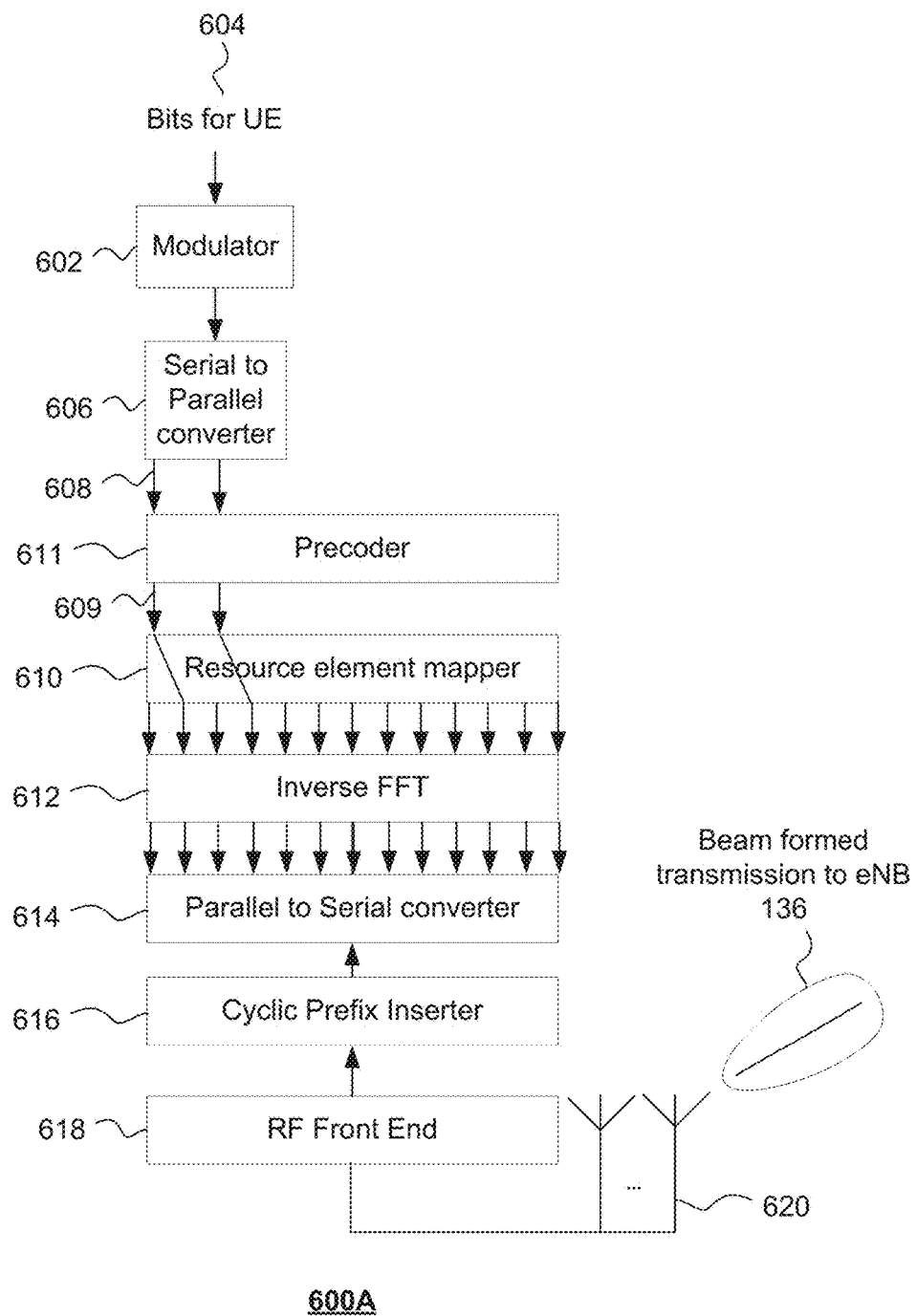
FIG. 6A illustrates an eNode B (eNB) according to an embodiment.

FIG. 6A shows a view of an eNB transmitter 600A that can be used to realise one or more than one eNB of the above eNBs 104 to 108.

The eNB 600A comprises one or more than one modulator 602. In FIG. 6, it is assumed that the eNB 600A is sending data to only the above UE 110. Therefore, a single modulator 602 is shown. However, some other number of modulators could be used according to a number of UEs being served by the eNB 600A. The modulator 602 can be configured to use a prescribed modulation and coding scheme. The modulator 602 is arranged to modulate data destined for the UE 110. A first set 604 of data is destined for the UE 110. The modulator 602 is arranged to modulate the data 604 according to a prescribed modulation scheme.

The modulated data is output to a respective serial to parallel converter 606 for conversion into a number of sub-streams of parallel modulated data 608. Two such substreams 608 have been illustrated. However, some other number of substreams could equally well have been used. The number of sub-streams allocated to a UE can vary according to an anticipated or desired data rate.

The parallel substreams 608 are input to a precoder 611. A precoder 611 is provided to support beam forming. The precoder 611 outputs precoded substreams 609. When CSI is unavailable, due to poor channel conditions, or the CSI shows that there would be no advantage to beam forming, then the precoding is such that beam forming is not realised and embodiments can switch to multiple transmissions of the same data using the same radio resources at the same time to compensate for poor channel conditions.

The parallel sub-streams 609 are input to a resource element mapper 610 that maps the sub-streams 609 onto respective subcarriers using an Inverse Fast Fourier Transform (IFFT) 612. The parallel output data from the IFFT 612, representing OFDM symbols, is converted, by a parallel to serial converter 614, into a stream of OFDM symbols and a cyclic prefix inserter 616 is arranged to insert a cyclic prefix as described above before transmission of the symbols via an RF front end 618 and one or more than one respective antenna 620. In the illustrated embodiment, a plurality of antennas is illustrated to support beam forming, which can be realised in either the time or frequency domain. The cyclic prefix inserter 616 is an embodiment of an inserter.

As indicated above, the modulator 602 can be configured according to channel conditions and can selectively change modulation constellation, that is, modulation schemes, according to channel conditions.

Each of the eNBs 104 to 108 can have a construction as indicated above. Their directed transmissions, intended for the same user equipment, are arranged to use the same radio resources at the same time to convey the same signal or data within the SFN area 127 and will have the same signals or data within the same resource elements of respective physical resource blocks. It will, therefore, be appreciated that multiple instances of the same signal, or multiple instances of the same resource elements, will be received by the UE 110. The UE 110 is configured to process those multiple instances, or at least two instances of those multiple instances, as multipath signals originating from a single eNB. Given the cyclic prefixes, the UE 110 will be able to recover the various instances of signals and accumulate their energy, which has a gain effect or at least increases the signal link margin in a manner that compensates for path loss and high attenuation at millimeter wave frequencies.

It can be appreciated that accumulating radio energy as above, that is, accumulating energy from multiple instances of the same signal from signals directed towards the UE 110, improves the link margin of the signals above the noise floor, that is, it improves the signal to noise ratio or the signal to noise and interference ratio.

Figure 6B:
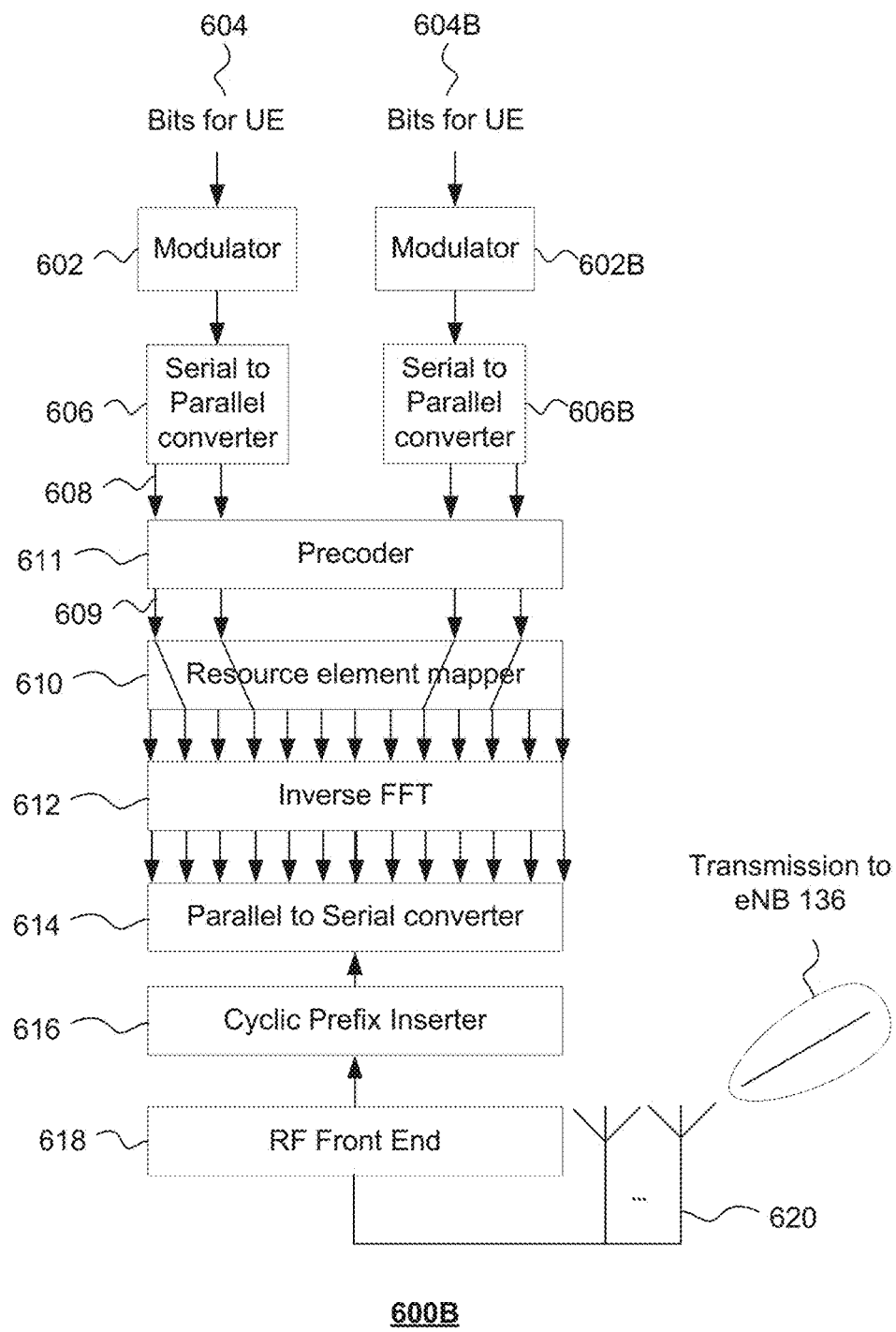
FIG. 6B depicts an eNode B (eNB) according to an embodiment.

Referring to FIG. 6B, there is shown a second embodiment of an eNB 600B that can be used to form one or more than one of the above eNBs 104, 106, 108. Reference numerals that are common to FIG. 6A and FIG. 6B refer to corresponding entities or features.

The eNB 600B is identical to the above eNB 600A but for the addition of another stream of data intended for the UE 110. The second stream of data 604B is identical to the first stream of data 604. It is processed, in a manner indicated above, by a respective modulator 602B, a respective serial to parallel converter 606B, the precoder 611 and resource mapper 610 to map the data 604B onto respective carriers.

The duplicated data 604B can be transmitted by the eNB 600B to the UE 110 within a different part of the same physical resource block that was used to carry the other instance of the data 604. Alternatively, or additionally, the duplicated data 604B can be transmitted within the same transmission time interval (TTI), that is, multiple instances of the data designated for the UE 110 can be transmitted within the same TTI or the multiple instances of the same data can be distributed across two or more different TTIs, or a combination of both of the foregoing.

Figure 6C:
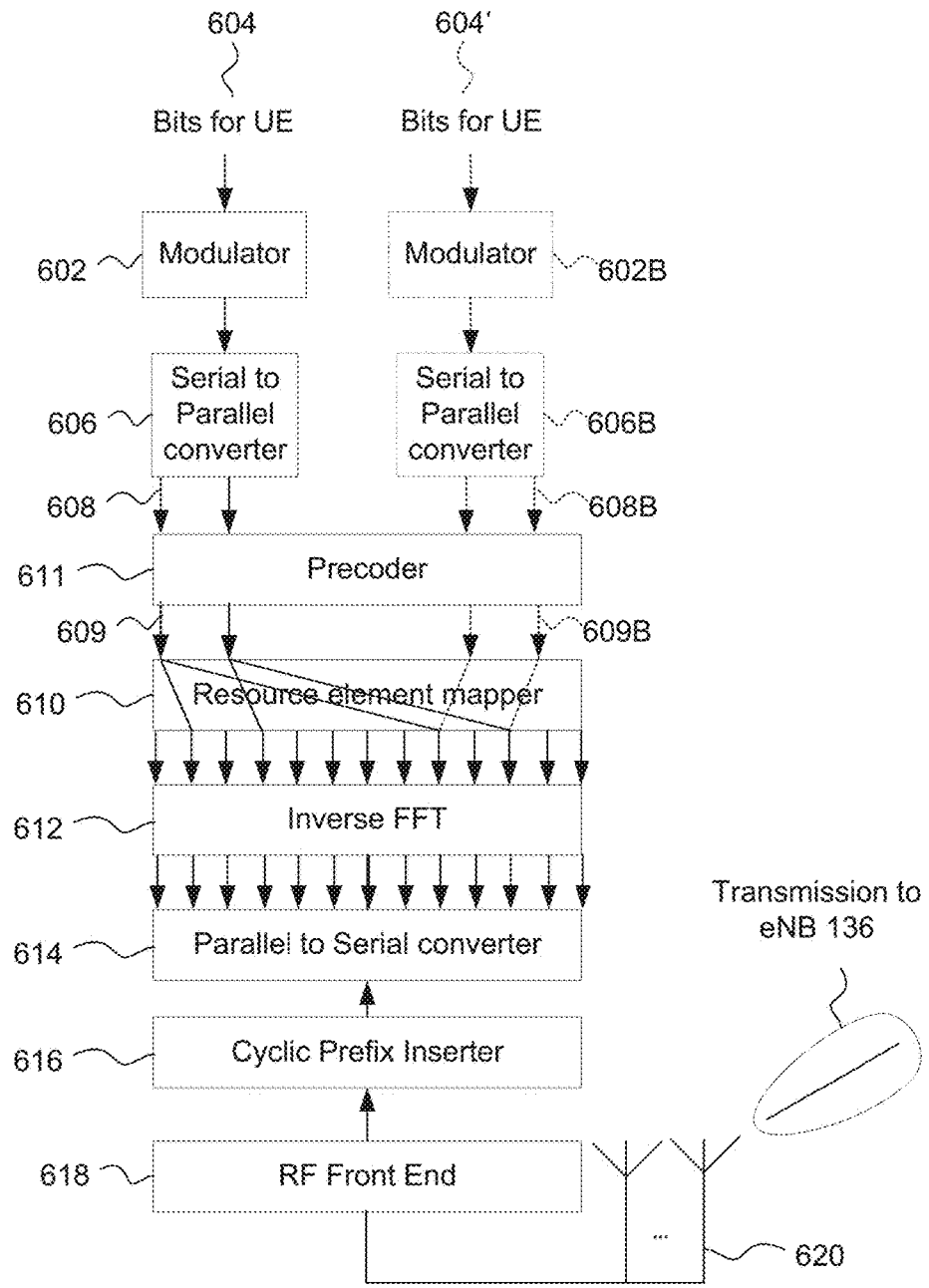
FIG. 6C shows an eNode B (eNB) according to an embodiment.

Referring to FIG. 6C, there is shown a third embodiment of an eNB 600C that can be used to form one or more than one of the above eNBs 104, 106, 108. Reference numerals that are common to FIG. 6B and FIG. 6C refer to corresponding entities or features.

The eNB 600C is identical to the above eNB 600B but for the additional stream of data intended for the UE 110. In the embodiment of FIG. 6C, the additional stream of data, that is, the duplicate instance of the data 604 intended for the UE 110 is derived from the original data 604 by mapper 610, which is configured to map the precoded data 609 onto duplicate sets of resource elements, as indicated by the solid lines from the data 609 to the respective inputs of the IFFT 612. In the present embodiment, the data has been duplicated to two pairs of inputs to the IFFT 612. The former second stream of data 604B, respective modulator 602B and respective serial to parallel converter 606B have been shown in dashed form to indicate that they are no longer required.

It can be appreciated that the duplicated data can be transmitted by the eNB 600C to the UE 110 within a different part of the same physical resource block that is or was used to carry the other instance of the data 604. Alternatively, or additionally, the duplicated data can be transmitted within the same transmission time interval (TTI), that is, multiple instances of the data 604 designated for the UE 110 can be transmitted within the same TTI or the multiple instances of the same data can be distributed across two or more different TTIs, or a combination of both of the foregoing.

Figure 7:
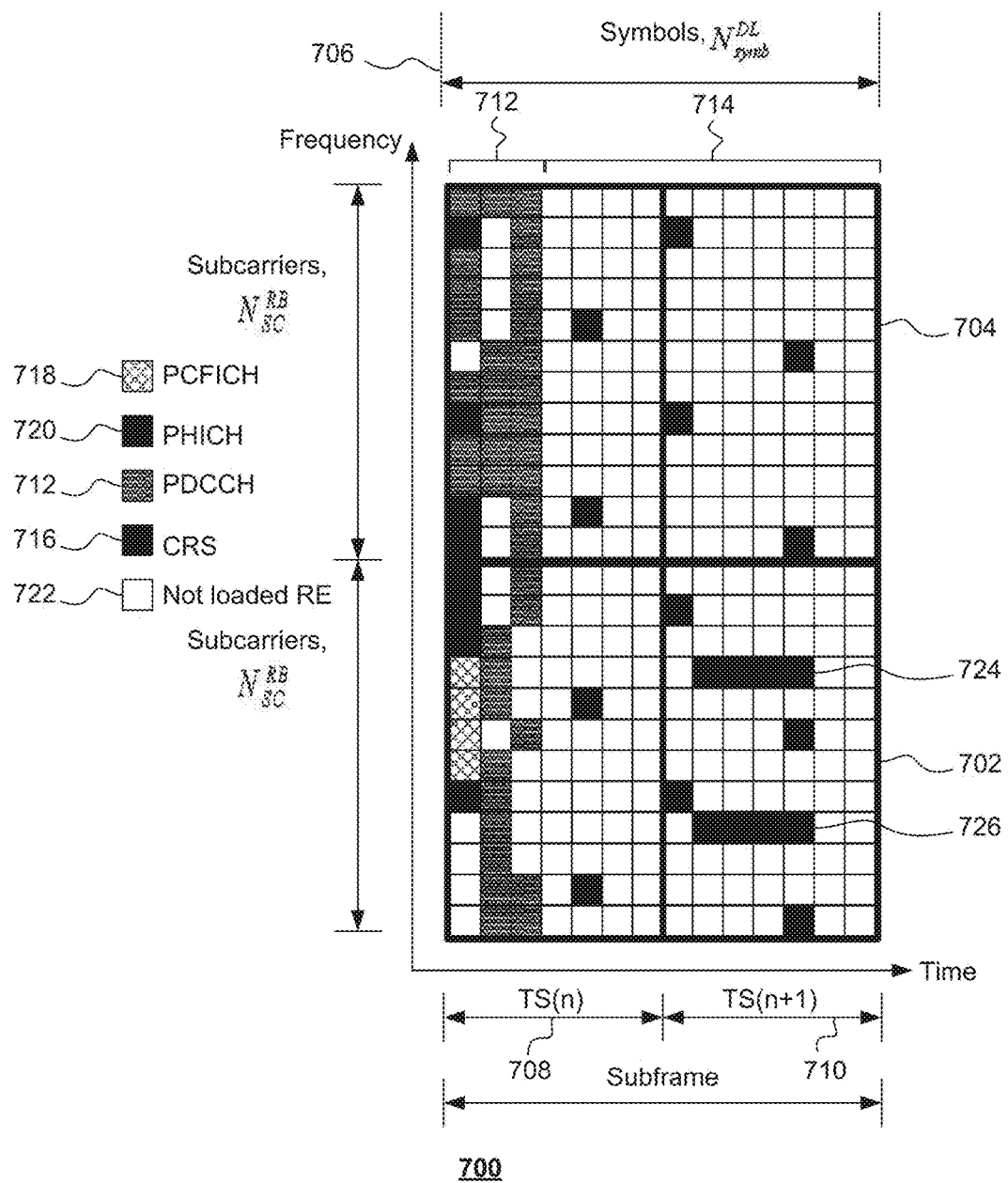
FIG. 7 depicts radio resources according to an embodiment.

FIG. 7 schematically illustrates a subframe 700A such as, for example, a downlink LTE subframe or other subframe, showing, at least in part, the structure of the signals 136 broadcast by one or more than one of the eNBs 104 to 108. The broadcast signals could represent, for example, a Physical Downlink Control Channel (PDCCH). Two illustrative resource blocks 702, 704 out of a total of $N_{BB}$ resource blocks of the subframe 700 are shown. The subframe 700 comprises a number, $N_{symb}^{DL}$, of OFDM symbols 706 along the time axis and $N_{BB} \cdot N_{SC}^{RB}$ subcarriers along the frequency axis. In the illustrated embodiment, it is assumed that normal cyclic prefixes are used such that there are fourteen symbols per subframe. The data carried on the signal such as a PDCCH can be referred to as downlink control information. Multiple UEs can be scheduled in one subframe of a radio frame, so multiple downlink control information messages can be sent using multiple PDCCHs. The PDCCH can be designed to be demodulated based on cell-specific reference signals (CRS) common to an entire cell. The subframe is divided into two time slots 708, 710.

In the illustrated embodiment, the subframe 700 comprises a set of L OFDM symbols (L=1, 2, 3) at the beginning of each subframe. The subframe comprises a PDCCH region 712 spanning a predetermined number of OFDM symbols; a width of three OFDM symbols in this example arrangement. In other embodiments, the subframe or PDCCH transmission uses a different pattern or a different number of OFDM symbols. There is shown a PDSCH region 714 for carrying downlink data, which spans the remaining OFDM symbols of the subframe. It will be appreciated that embodiments can be realised in which some other number of OFDM symbols are used per time slot such as, for example, 6 OFDM symbols in the case of an extended cyclic prefix. The same applies to the uplink where OFDM symbols are replaced by SC-FDMA symbols.

In the PDCCH region 712, as well as the PDSCH 714, other signals can be transmitted such as, for example, one or more than one cell specific reference signal (CRS) CRS 716. The CRS 716 can also be transmitted in the downlink data (PDSCH) region 714. Other control information transmitted in the PDCCH region 712 of the subframe can comprise at least one of a Physical Control Format Indicator Channel (PCFICH) 718 and a Physical Hybrid-ARQ Indicator Channel (PHICH) 720. The PCFICH 718 informs the UE 110 about the size of the control region (one, two or three OFDM symbols). There is only one PCFICH on each component carrier, i.e., in each cell. The PHICH 720 is used to signal hybrid-ARQ acknowledgements in response to uplink shared channel transmissions. Multiple PHICHs 720 can exist in each cell. The subframe also comprises unused resource elements 722

It can be appreciated that the lower resource block 702 comprises two instances of the same data 604 as can be appreciated from resource elements 724 and/or 726 indicated above. It will be appreciated however that the eNBs 600A according to FIG. 6A would only have a single instance of such data such as, for example, the data. Other instances of the data would be conveyed by one of the other eNBs 104 to 108 using the same respective resource elements 724 and/or 726. One skilled in the art will appreciate that embodiments are not limited to using the particular resource elements shown in FIG. 7. Other resource elements could equally well be used for conveying the same data. Additionally, or alternatively, although embodiments have been illustrated in which the same data 726 is conveyed using the same subframe 700A, embodiments are not limited thereto. Embodiments can equally well be realised in which the same data is broadcast using respective subframes.

Figure 8:
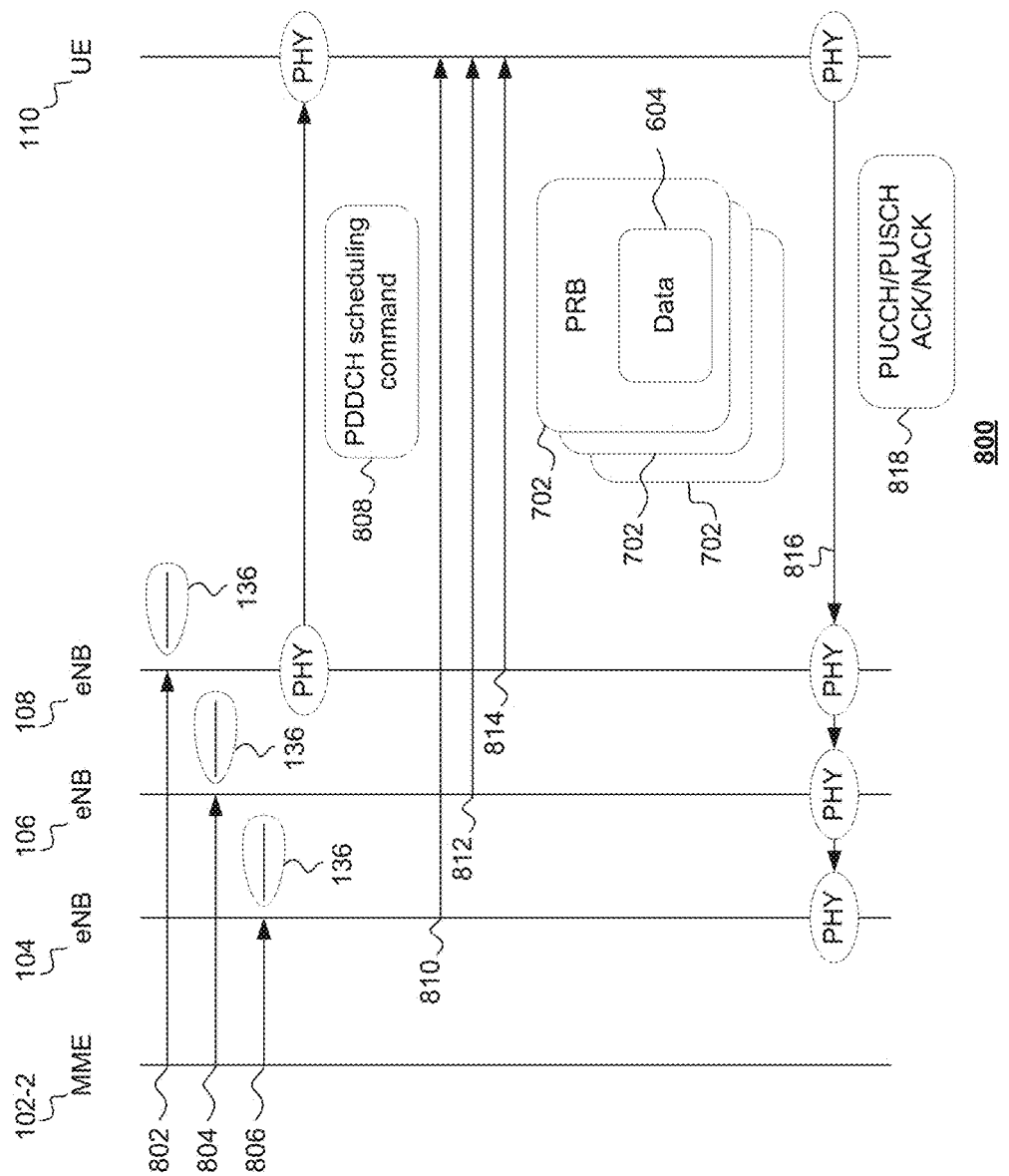
FIG. 8 illustrates a first protocol according to an embodiment.

Referring to FIG. 8, there is shown a view 800 of a protocol according to an embodiment. Within a challenging radio environment, in particular using millimeter waves as carriers, the path losses and attenuation will be significant. Therefore, the MME 102-2 instructs, at 802 to 806, two or more of the eNBs 104 to 108 to transmit the same data 604. In the illustrated embodiment, it can be appreciated that the MME 102-2 has instructed three eNBs 104 to 108 to transmit the data. However, some other number of eNBs could alternatively be used for transmitting the same data 604, or a duplicate of the same data.

The data 604 is intended for the UE 110. Therefore, the two or more eNBs 104 to 108 configure their transmissions to make them omnidirectional/sectored or directional, that is, beam forming can be used to direct the transmissions to the UE 110 via respective beams, sectored antennas or omnidirectional antennas 136.

Signalling 808 can be provided by at least one of the eNBs to provide an indication of the resources to be used in transmitting the data 604 to the user equipment. Embodiments can be provided in which multiple instances of that signalling 808 are provided by respective eNBs of the eNBs 104 to 108. Such multiple instances of that signalling 808 can be realised using the above embodiments such as, for example, the embodiment described with reference to FIGS. 5A and 5B, in which such signalling would be transmitted by a plurality of eNBs using the same radio resources at the same time and processing the multiple transmissions of the plurality of eNBs as multipath instances of a common transmission from an eNB.

The data 604 is output by each of the two or more eNBs 104 to 108 at 810 to 814 via common PRBs 702; each instance of the PRBs 702 having been transmitted by a respective eNB 104 to 108 at the same time.

Optionally, in response to receiving the data 604 successfully or otherwise, the UE 110 can be arranged to transmit, at 816, an ACK or NACK 818 to a primary eNB of the set of eNBs cooperating to provide the SFN area coverage 127 or to any or all of the eNBs 104 to 108 providing the SFN coverage area 127.

The receiving UE 110 is configured to treat the separate transmissions by the participating eNBs 104 to 108 as if they were multipath signals or multipath instances of the same transmission, which, via the cyclic prefixes, allows multiple instances of the same signal to be received and processed.

It will be appreciated that the foregoing provides improved coverage, in particular, an improved signal to noise ratio or signal to noise plus interference ratio for the signal intended for the UE 110. The improvement follows, at least in part, from the user equipment having multiple instances of the same data. The multiple instances of the same data have been delivered via two or more eNBs. The eNBs can be configured to cooperate to provide a SFN area.

It will be appreciated that each element of the protocol shown in FIG. 8 can be taken jointly or severally with the other elements of the protocol in any and all combinations.

Figure 9:
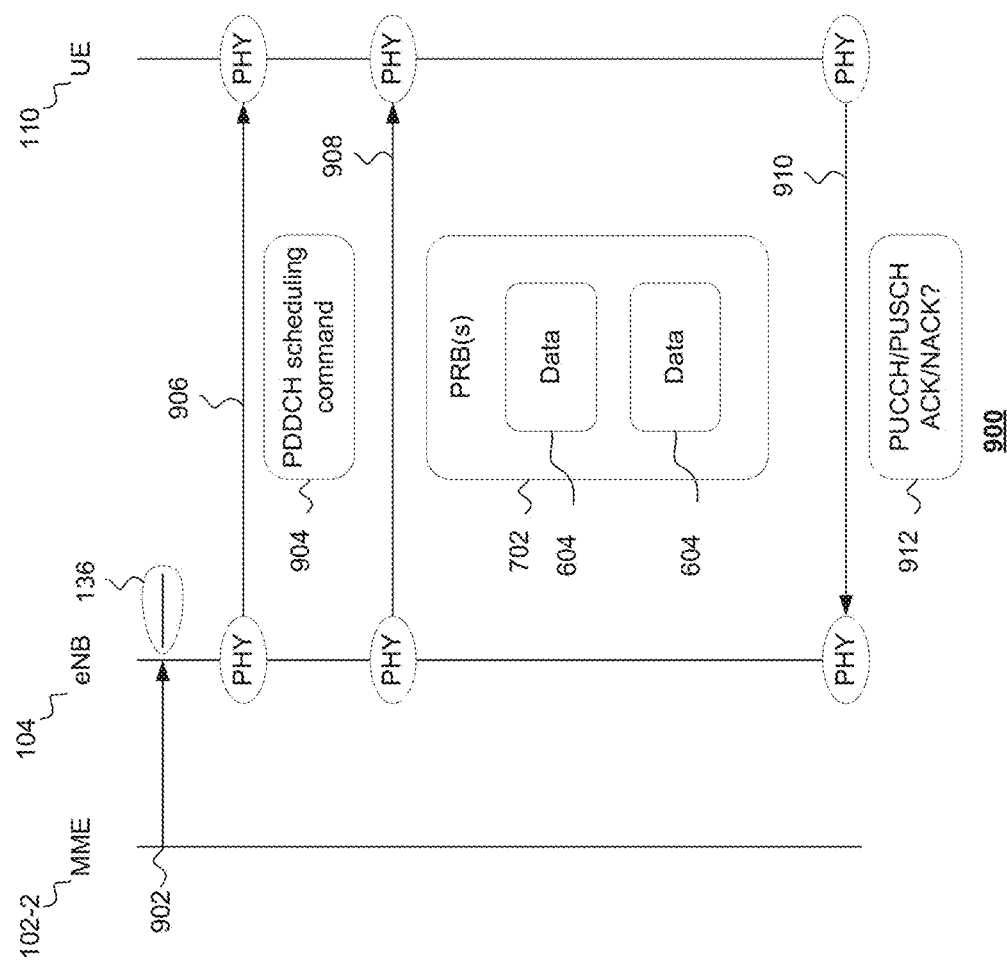
FIG. 9 shows a second protocol according to an embodiment.

FIG. 9 shows a view 900 of a second protocol according to an embodiment. The MME 102-2, or other network entity, instructs, at 902, an eNB 104 serving the UE 110 to transmit data 604 to the latter. If the channel state information indicates that beam forming could be beneficial, the eNB 104 can configure its transmission using beam forming 136. However, if the CSI indicates that beam forming is not beneficial, and to avoid problems associated with transmissions using millimeter wave frequencies as indicated above, the eNB 104 can be configured to transmit multiple instances of the same data.

Signalling 904 to allow the user equipment 110 to receive the data 604 is provided to the user equipment 110 at 906. The data 604 is transmitted to the UE 110 using one or more than one physical resource block 702 at 908. The resource bock 702 can contain one or more than one instance of the data 604. In the illustrated embodiment, two instances of the data 604 are shown. Additionally, or alternatively, the multiple instances of the data could be conveyed to the UE 110 via respective resource blocks.

Optionally, in response to receiving the data 604 successfully or otherwise, the UE 110 can be arranged to transmit, at 910, an ACK or NACK 912 to the eNB 104.

The receiving UE 110 is configured to process the multiple instances of the data to improve the noise margin, that is, to provide a gain that improves the signal to noise ratio or signal to noise plus interference ratio. For example, the multiple instances of the data 604 could be added together or otherwise accumulated to increase the signal to noise ratio, that is, to accumulate radio energy to improve detection.

Figure 10:
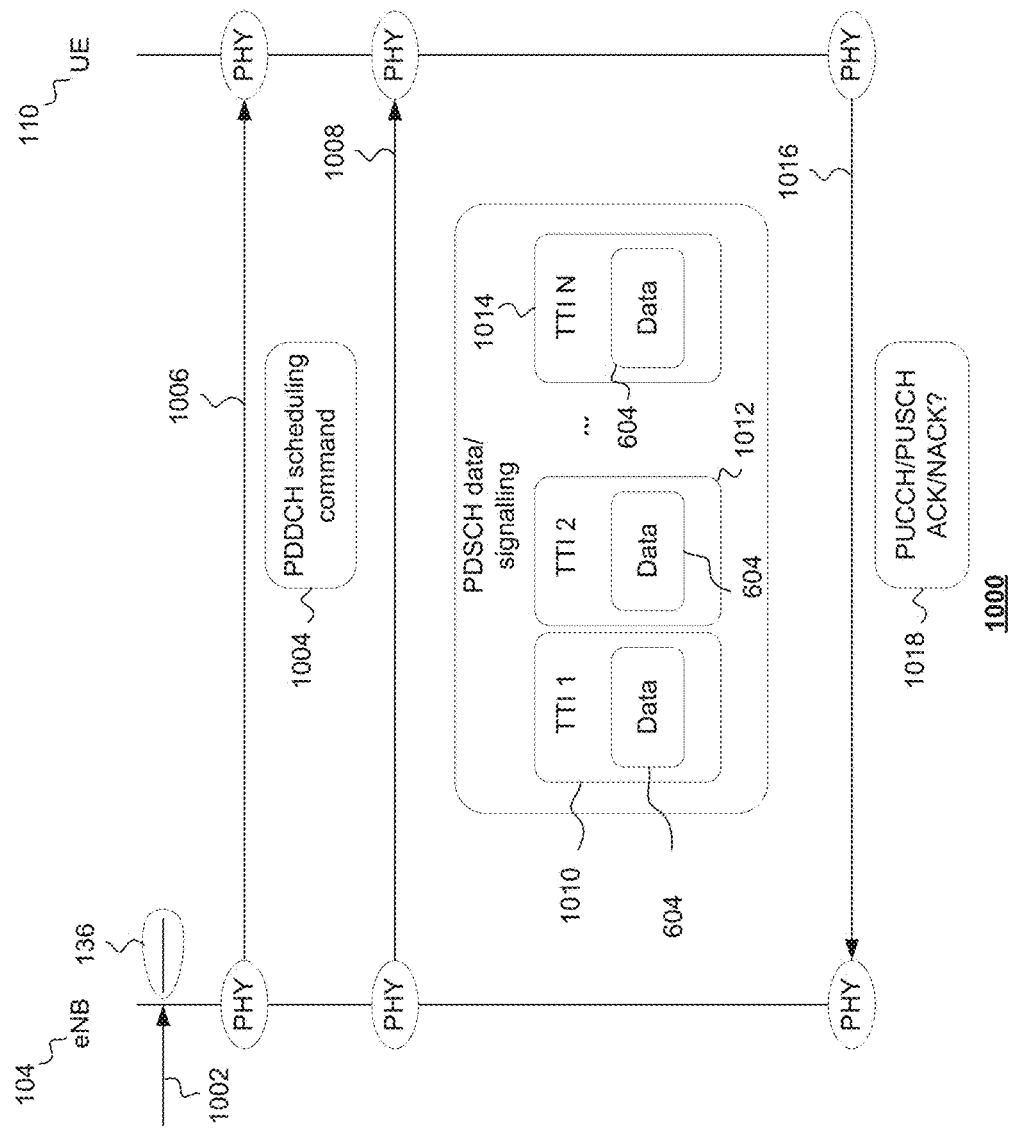
FIG. 10 illustrates a third protocol according to an embodiment.

FIG. 10 shows a view 1000 of a further protocol according to an embodiment. An eNB 104 is configured, at 1002, to output a transmission 1004 to the UE 110 at 1006. The transmission 1004 can comprise signalling to allow the UE 110 to receive respective data 604.

The data 604 designated for the UE 110 is transmitted, at 1008, using one or more than one subframe 702 containing the data 604 within respective transmission time intervals (TTIs) 1010, 1012, 1014.

Optionally, in response to receiving the data 604 successfully or otherwise, the UE 110 can be arranged to transmit, at 1016, an ACK or NACK 1018 to the eNB 104.

As above, since the UE 110 receives multiple instances of the data 604, even though spread over multiple TTIs, combining techniques can be used to combine the received instances of the data 604 to improve the overall signal to noise ratio or signal to noise plus interference ratio. For example, the radio energy associated with the received multiple instances of the data 604 can be accumulated in a manner to constructively increase the signal to noise ratio or the signal to noise to interference ratio.

Figure 11:
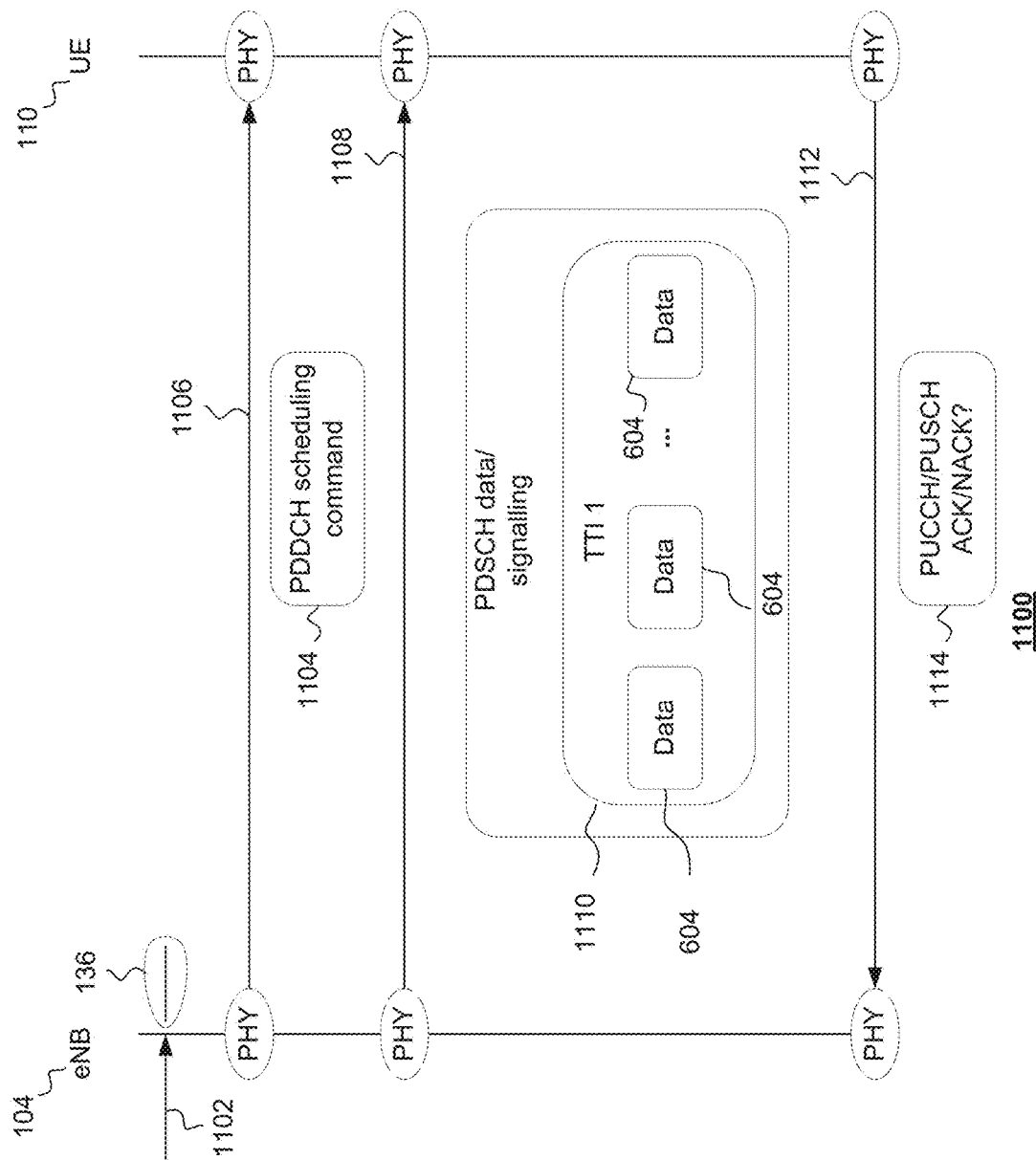
FIG. 11 depicts a fourth protocol according to an embodiment.

FIG. 11 shows a view 1100 of a still further protocol according to an embodiment. At 1102, an eNB 104 is configured to communicate with a UE 110. The eNB 104 forwards information 1104, at 1106, to the UE 110 associated with providing access to the data 604 to be transmitted.

Multiple instances of the data 604 are transmitted, at 1108, to the UE 110 via a respective transmission time interval 1110. It can be appreciated that the TTI 1110 comprises a plurality of instances of the data 604. In the embodiment shown, the TTI 1110 comprises N instances of the data 724/726.

Optionally, in response to receiving the data 604 successfully or otherwise, the UE 110 can be arranged to transmit, at 1112, an ACK or NACK 1114 to the eNB 104.

As above, since the UE 110 receives multiple instances of the data 604, spread throughout a single TTI, combining techniques can be used to combine the received instances of the data 604 to improve the overall signal to noise ratio or signal to noise plus interference ratio. For example, the radio energy associated with the instances of the data 604 can be accumulated from each of the received instances, which improves the signal to noise ratio and the signal to noise plus interference ratio.

Figure 12:
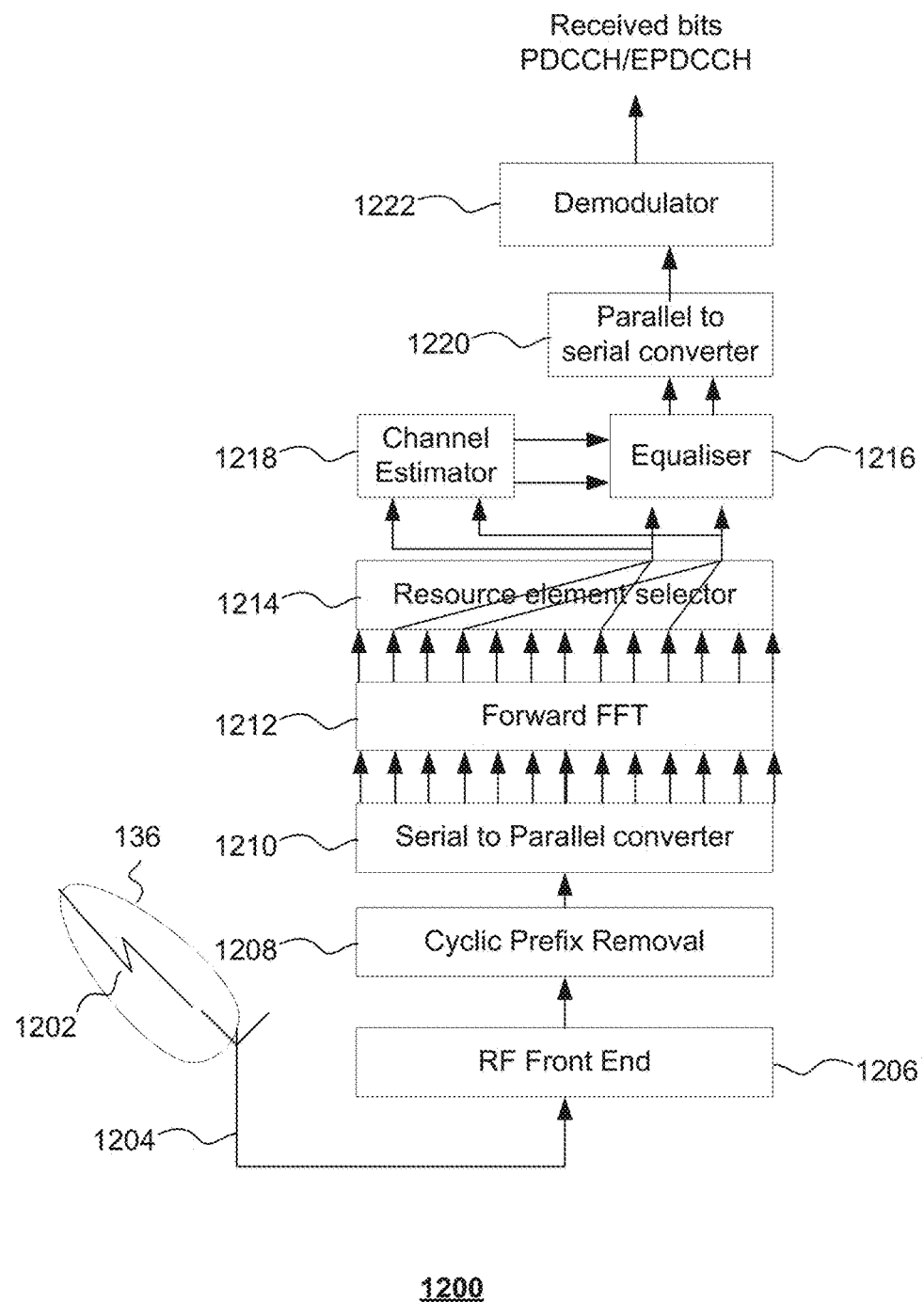
FIG. 12 shows a user equipment according to an embodiment.

Referring to FIG. 12, there is shown schematically a view 1200 of a part of a user equipment (UE), such as UE 110, for processing a received signal 1202 comprising one or more than one instance of data 604 or signal according to an embodiment; the one or more than one instance of the data 604 or signal having been transmitted from one or more than one of the eNBs 104, 106 and 108.

The received signal 1202 is received using at least one or more than one antenna 1204, and, in some examples, is received by multiple antennas. The received signal 1202 is processed by an RF front end 1206. The RF front end 1206 can comprise, for example, a filter (not shown) for filtering the received signal 1202 and a Low Noise Amplifier (not shown).

A cyclic prefix removal module 1208 is arranged to remove any of the above mentioned cyclic prefixes. The signal 1202 is then passed through a serial to parallel converter 1210, which outputs associated symbols. The symbols output by the serial to parallel converter 1210 are processed by a forward Fast Fourier Transform module 1212. The output of the FFT module 1212 is passed to a resource element selector 1214, which selects the radio resources intended for the receiving UE for further processing and ignores other radio resources since they are typically intended for other UEs. It will be appreciated that the radio resources selected for further processing will comprise the one or more than one instance of the data 604. The one or more than one instance of the data 604 will be processed as if they were multiple path instances of a single transmission from the same eNB.

The selected radio resources are processed by an equalizer 1216 and a channel estimator 1218. The channel estimator 1218 processes the selected radio resources with a view to influencing the operation of the equalizer 1216. The output of the equalizer 1216 is converted into serial form, via a parallel to serial converter 1220. The parallel signals are then processed by a demodulator 1222 that is adapted to demodulate any received data to recover at least one of, and perhaps both of, subcarriers and symbols constituting or carrying the one or more than one instance of the data 604.

It will be appreciated that at least one or more of the RF front end 1206, cyclic prefix module 1208, serial to parallel converter 1210, FFT module 1212, resource element selector 1214, equaliser 1216, channel estimator 1218, parallel to serial converter 1220 and demodulator, taken jointly and severally in any and all combinations, are examples of one or more than one processing module. It will be appreciated that the foregoing features have corresponding features in FIG. 2.

The data output by the demodulator 1222 can comprise, for example, at least one of identification data such as, for example, a cell-specific reference signal, CRS, either with or without a respective port, and synchronization data such as, for example, at least one of a Primary (PSS) or Secondary Synchronization Signal (SSS), and positioning signals taken jointly and severally in any and all combinations as well as or in addition to receiving the multiple instances of the data 604.

Alternatively, or additionally, having established communication between the eNB, or other transmit point, and the user equipment 110, the eNB can assign other radio resources to the UE 110 for supporting communication between the eNB and the user equipment 110.

Figure 13:
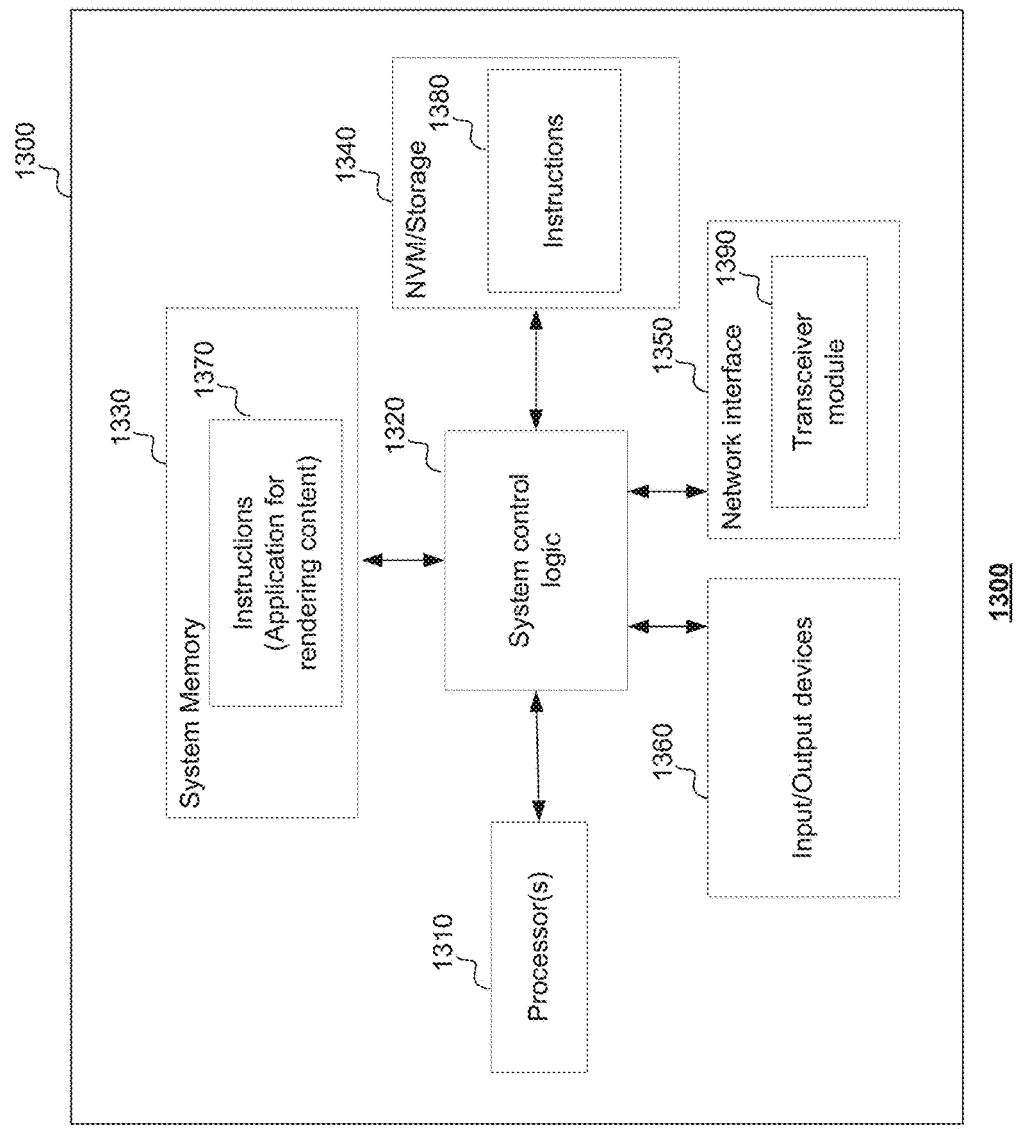
FIG. 13 illustrates a system according to an embodiment.

FIG. 13 illustrates, for one embodiment, an example system 1300 for realising a UE 110 as described above with reference to FIGS. 2 and 12 taken jointly and severally. The system 1300 comprises one or more processor(s) 1310, system control logic 1320 coupled with at least one of the processor(s) 1310, system memory 1330 coupled with system control logic 1320, non-volatile memory (NVM)/storage 1340 coupled with system control logic 1320, and a network interface 1350 coupled with system control logic 1320. The system control logic 1320 may also be coupled to Input/Output devices 1360. The system can be arranged to receive and process one or more than one instance of the data 604 transmitted over an unlicensed frequency band that is not licensed for cellular use, or over a further frequency band such as millimeter wave frequencies whether or not licensed for cellular use.

Processor(s) 1310 may include one or more single-core or multi-core processors. Processor(s) 1310 may include any combination of general-purpose processors and/or dedicated processors (e.g., graphics processors, application processors, baseband processors, etc.). Processors 1310 may be operable to carry out the above described signal processing using suitable instructions or programs (i.e. to operate via use of processor, or other logic, instructions). The instructions may be stored in system memory 1330, as system memory instructions 1370, or, additionally or alternatively, may be stored in (NVM)/storage 1340, as NVM instructions 1380.

System control logic 1320, for one embodiment, may include any suitable interface controllers to provide for any suitable interface to at least one of the processor(s) 1310 and/or to any suitable device or component in communication with system control logic 1320.

System control logic 1320, for one embodiment, may include one or more memory controller(s) to provide an interface to system memory 1330. System memory 1330 may be used to load and store data and/or instructions for the system 1300. A system memory 1330, for one embodiment, may include any suitable volatile memory, such as suitable dynamic random access memory (DRAM), for example.

NVM/storage 1340 may include one or more than one tangible, non-transitory computer-readable medium used to store data and/or instructions, for example. NVM/storage 1340 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 1340 may include a storage resource that is physically part of a device on which the system 1300 is installed or it may be accessible by, but not necessarily a part of, the system 1300. For example, the NVM/storage 1340 may be accessed over a network via the network interface 1350.

System memory 1330 and NVM/storage 1340 may respectively include, in particular, temporal and persistent, that is, non-transient, copies of, for example, the instructions 1370 and 1380, respectively. Instructions 1370 and 1380 may include instructions that when executed by at least one of the processor(s) 1310 result in the system 1300 implementing the processing of the method(s) of any embodiment or any other embodiment as described herein. In some embodiments, instructions 1370 and 1380, or hardware, firmware, and/or software components thereof, may additionally/alternatively be located in the system control logic 1320, the network interface 1350, and/or the processor(s) 1310.

Network interface 1350 may have a transceiver module 1390 to provide a radio interface for system 1300 to communicate over one or more network(s) (e.g. wireless communication network) and/or with any other suitable device. The transceiver 1390 may implement receiver module that performs the above processing of the received signals to realise interference mitigation. In various embodiments, the transceiver 1390 may be integrated with other components of the system 1300. For example, the transceiver 1390 may include a processor of the processor(s) 1310, memory of the system memory 1330, and NVM/Storage of NVM/Storage 1340. Network interface 1350 may include any suitable hardware and/or firmware. Network interface 1350 may be operatively coupled to the antenna, or to one or more than one antenna to provide SISO or a multiple input, multiple output radio interface. Network interface 1350 for one embodiment may include, for example, a network adapter, a wireless network adapter, a telephone modem, and/or a wireless modem.

For one embodiment, at least one of the processor(s) 1310 may be packaged together with logic for one or more controller(s) of the system control logic 1320. For one embodiment, at least one of the processor(s) 1310 may be packaged together with logic for one or more controllers of the system control logic 1320 to form a System in Package (SiP). For one embodiment, at least one of the processor(s) 1340 may be integrated on the same die with logic for one or more controller(s) of the system control logic 1320. For one embodiment, at least one of the processor(s) 1310 may be integrated on the same die with logic for one or more controller(s) of system control logic 1320 to form a System on Chip (SoC).

In various embodiments, the I/O devices 1360 may include user interfaces designed to enable user interaction with the system 1300, peripheral component interfaces designed to enable peripheral component interaction with the system 1300, and/or sensors designed to determine environmental conditions and/or location information related to the system 1300.

Figure 14:
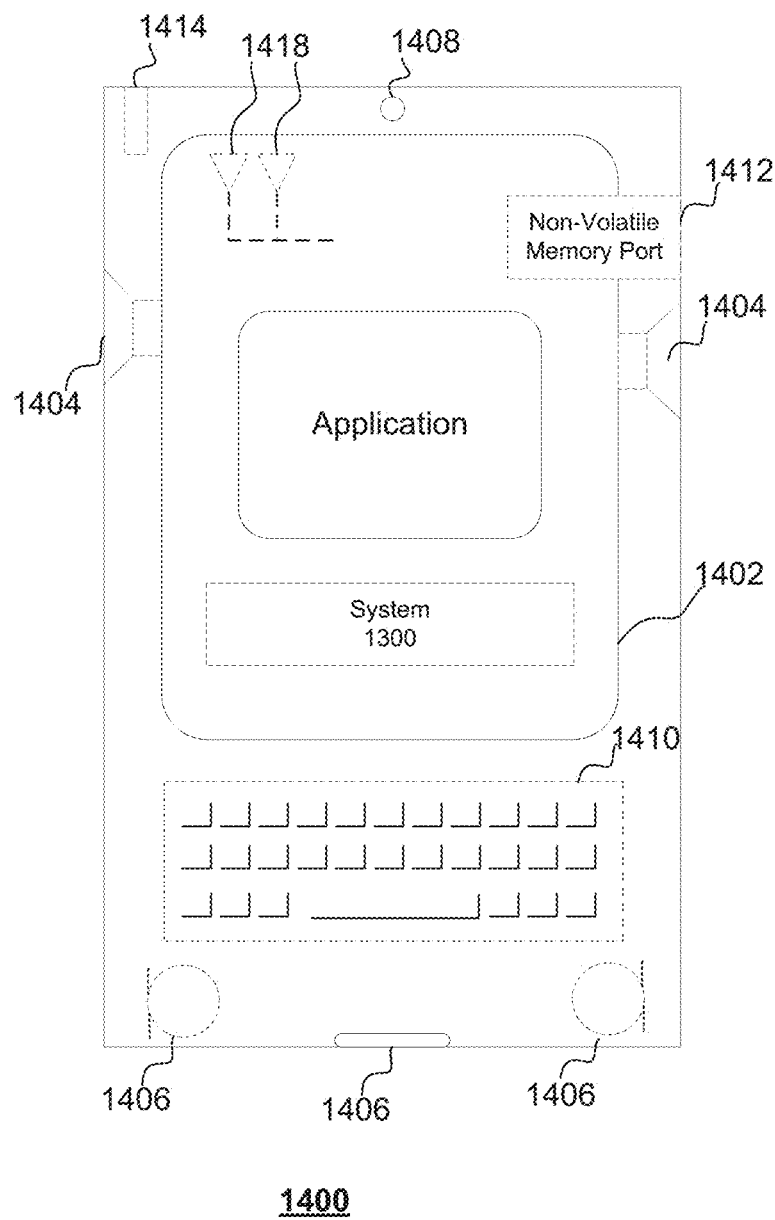
FIG. 14 depicts a user equipment according to an embodiment.

FIG. 14 shows an embodiment in which the system 1300 is used to realise a UE such as UE 110. Such a user equipment 110 can be realised in form of a mobile device 1400.

In various embodiments, user interfaces of the mobile device 1400 could include, but are not limited to, a display 1402 (e.g., a liquid crystal display, a touch screen display, etc.), a speaker 1404, a microphone 1406, one or more cameras 1408 (e.g., a still camera and/or a video camera), a flashlight (e.g., a light emitting diode), and a keyboard 1410.

In various embodiments, one or more than one peripheral component interface may be provided including, but not limited to, a non-volatile memory port 1412, an audio jack 1414, and a power supply interface 1416.

In various embodiments, one or more sensors may be provided including, but not limited to, a gyro sensor, an accelerometer, a proximity sensor, an ambient light sensor, and a positioning unit. The positioning unit may also be part of, or interact with, the network interface 1350 to communicate with components of a positioning network, e.g., a global positioning system (GPS) satellite.

In various embodiments, the system 1400 may be a mobile computing device such as, but not limited to, a laptop computing device, a tablet computing device, a netbook, a mobile phone, etc. In various embodiments, the system 1400 may have more or fewer components, and/or different architectures.

Figure 15:
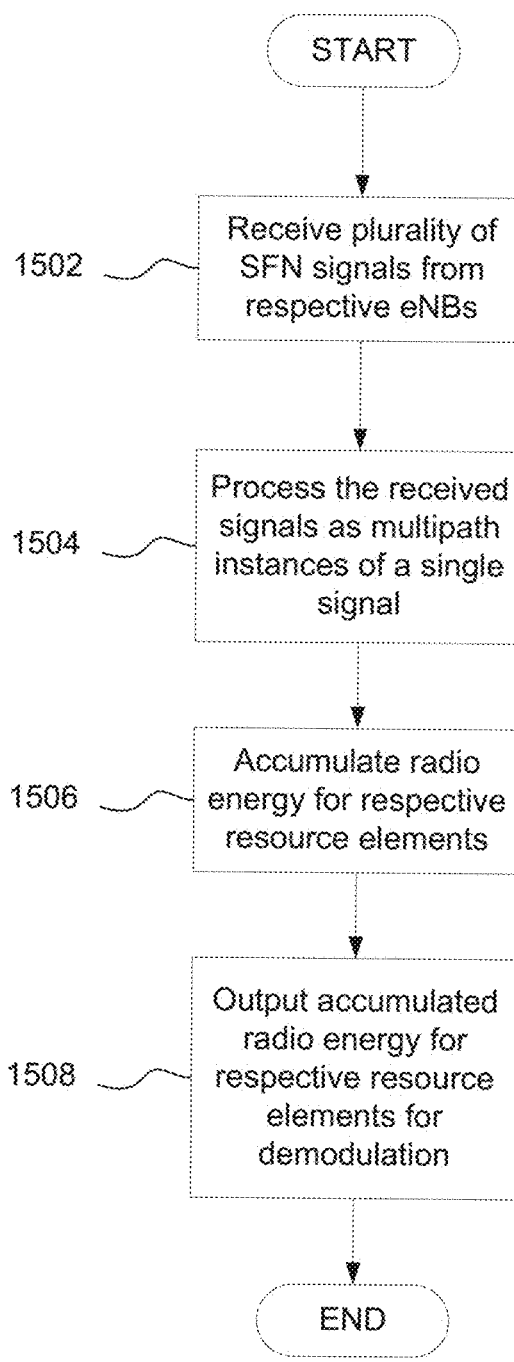
FIG. 15 shows a flowchart according to an embodiment.

FIG. 15 shows a flowchart for processing received signals according to an embodiment. The UE 110 receives, at 1502, the transmissions from the eNBs 104 to 108. The transmissions may be SFN transmissions. The transmissions convey multiple instances of the same data or the same signal transmitted using the same radio resources at the same time. The transmissions comprise multiple instances of the same data designated for the UE 110. The common or same data is carried using respective resource elements.

The UE 110 processes, at 1504, the transmissions as multipath instances of a single transmitted signal and, optionally, accumulates, at 1506, energy corresponding to respective resource elements carrying the same data.

The processed multipath signals and/or the accumulated radio energy is output, at 1508, for further processing such as, for example, demodulation, to recover data carried by the foregoing resource elements.

Figure 16:
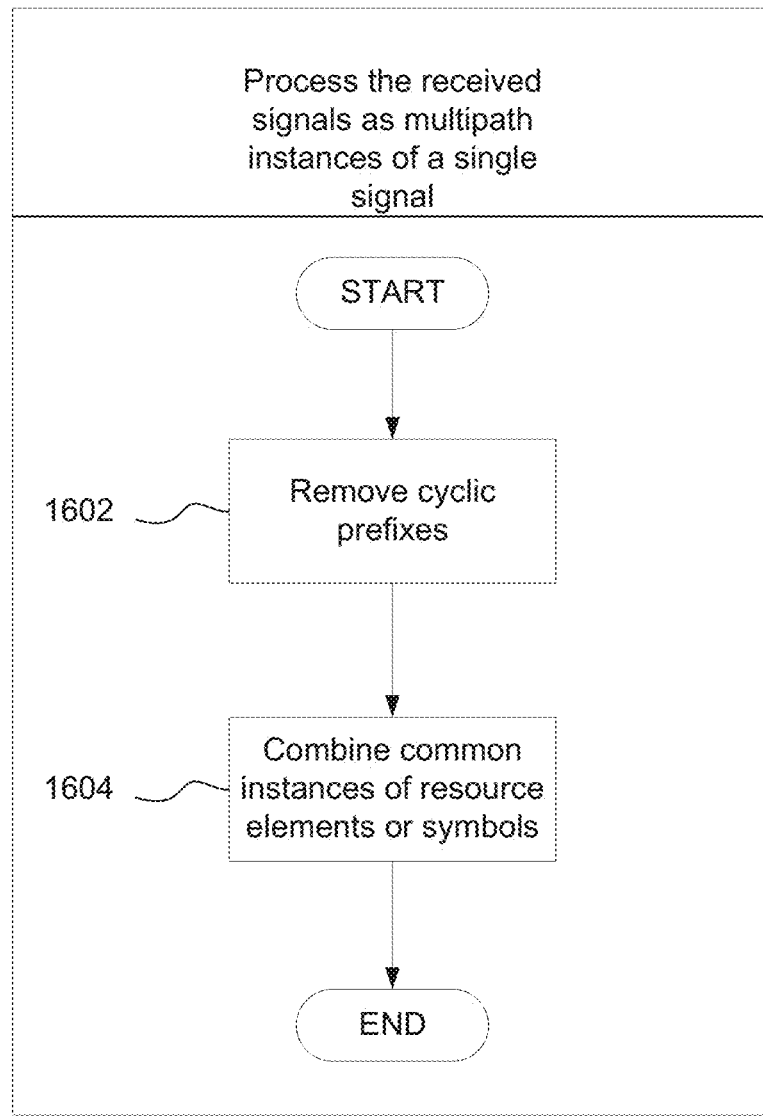
FIG. 16 illustrates a flowchart according to an embodiment.

FIG. 16 shows a flowchart for processing the received signals as multipath instances of a single signal according to an embodiment. The cyclic prefixes of the symbols associated with the respective resource elements carrying the same data are removed at 1602. The common resource elements or OFDM symbols carrying the same data of the symbols are combined at 1604.

Figure 17:
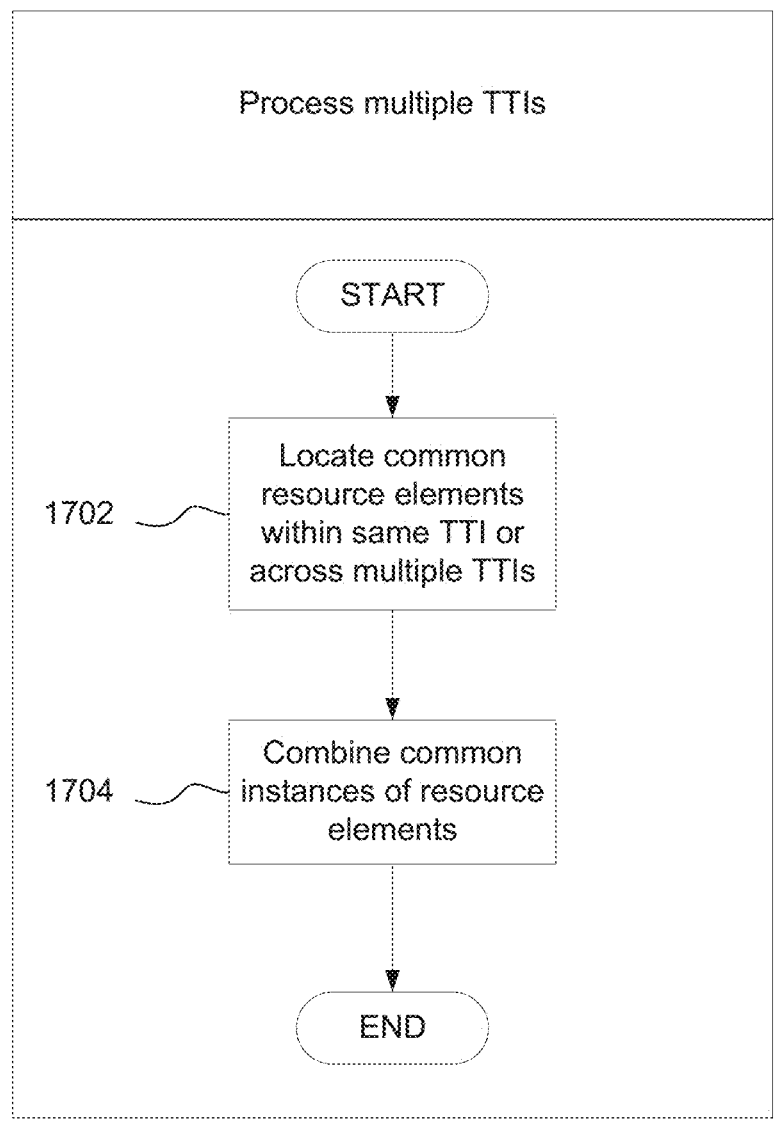
FIG. 17 depicts a flowchart according to an embodiment.

FIG. 17 shows a flowchart for processing received signals according to an embodiment. Multiple instances of resource elements carrying the same data are located, at 1702, within at least one of the same transmission time interval or within multiple transmission time intervals. The energy associated with the located resource elements carrying the same data is accumulated at 1704.

Figure 18:
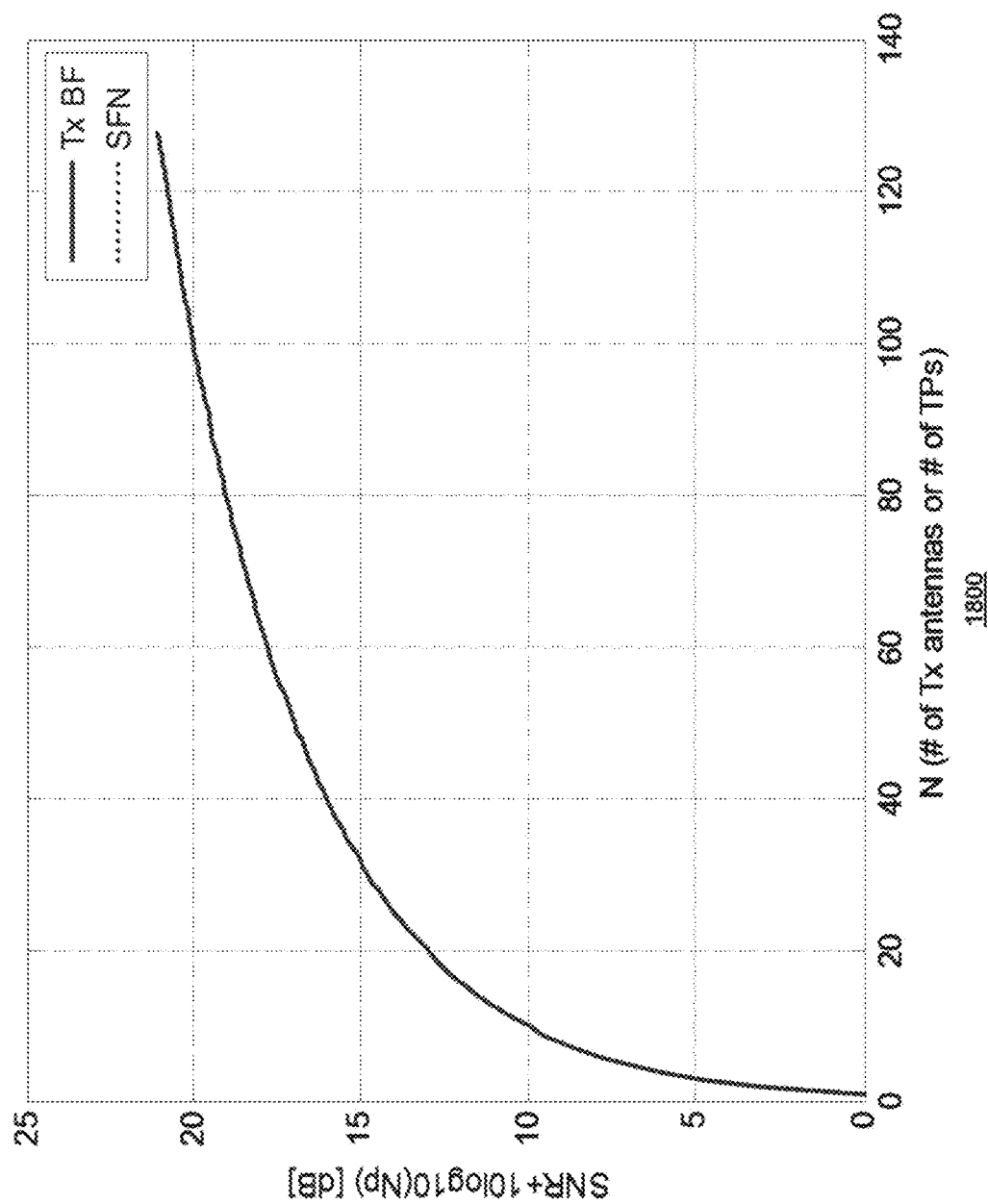
FIG. 18 shows simulation results of a variation of SNR with transmission mode.

Referring to FIG. 18, there is shown a graph 1800 of a simulation of the variation of signal to noise ratio according to embodiments using SFN as compared to conventional beam forming. The simulation assumptions are that a plurality of transmit points such as, for example, eNBs, are geographically distributed and that the transmissions from the transmit points under beam forming and under SFN have the same amplitudes and that the channels between the transmit points and the UE are uncorrelated. The achievable SNR gains for SNF and BF were shown to be the same for the same degrees of freedom, that is, where the number of transmit antennas for beam forming and the number of transmit points were the same.

Figure 19:
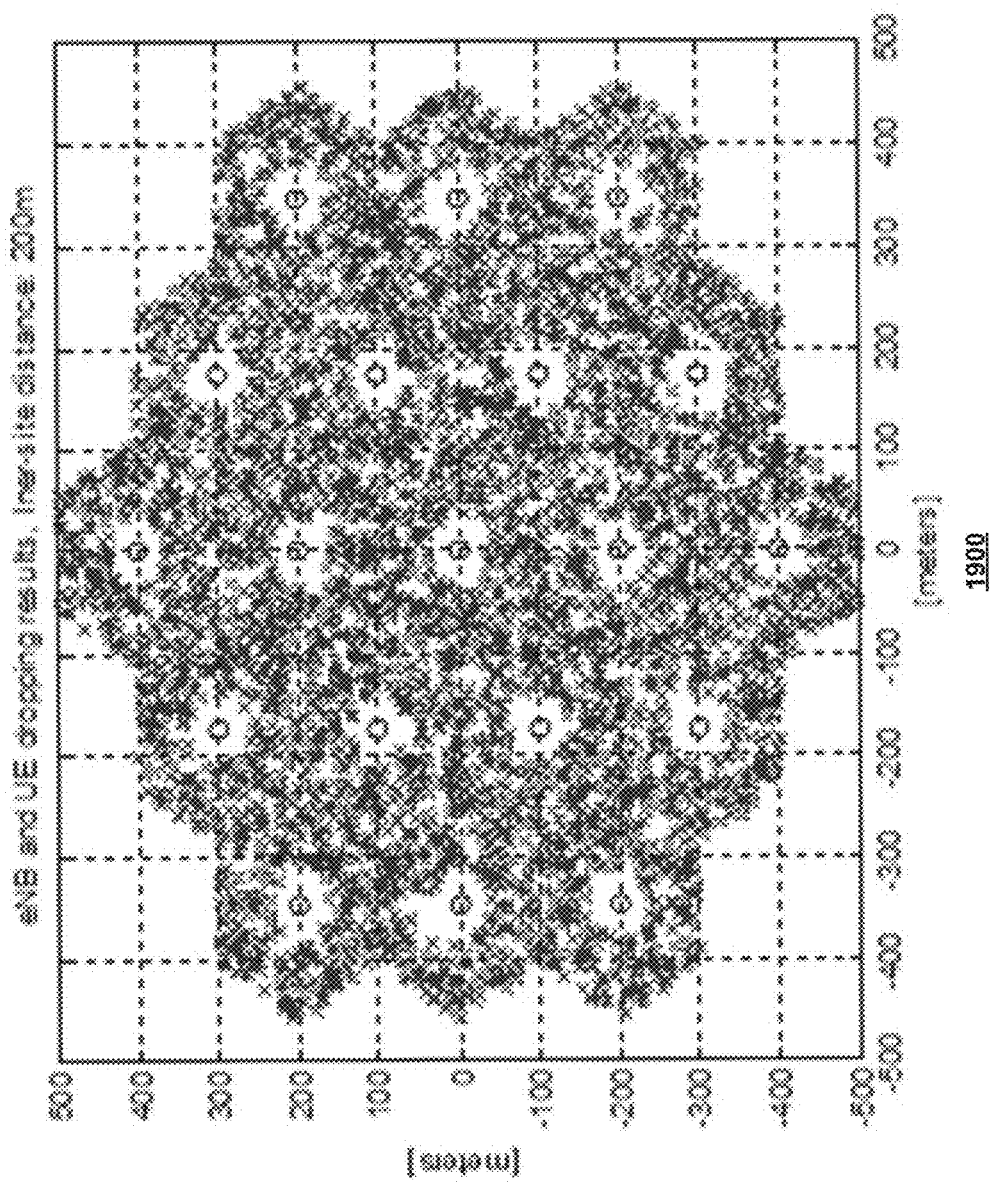
FIG. 19 illustrates a simulation of a cell deployment scenario according to an embodiment.
Figure 20:
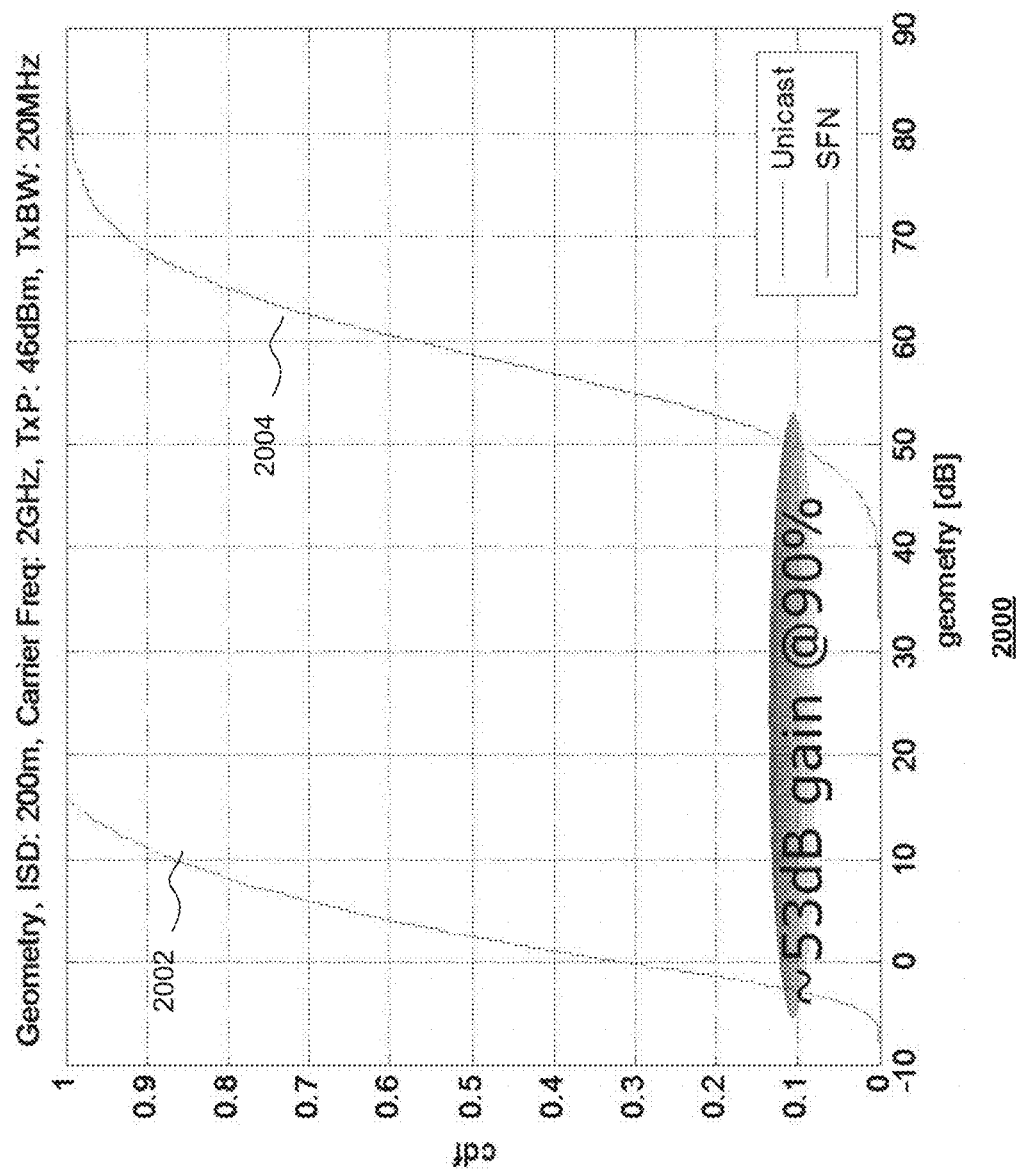
FIG. 20 depicts geometry curves for a further simulation at GHz frequencies.

FIG. 19 shows a view 1900 of a simulation of a cell deployment scenario for a plurality of eNBs, located at the 19 circles, and various user equipment positions, denoted by the crosses. The simulation used 57 sectors or cells deployed at an inter-site distance of 200 m. The carrier frequencies were assumed to be 2 GHz, with a transmit power of 46 dBm and a transmit bandwidth of 20 MHz. Each cell transmitted the same signal using the same resource elements at the same time. The resulting signal to noise ratios for an SFN transmission mode according to the embodiments as compared to a single cell, or eNB, transmission using the same resource elements is given in the graph 2000 of FIG. 20, which shows the variation of the cumulative distribution function of the SNR with geometry. A first curve 2002 represents the variation of the cumulative distribution function (CDF) of the SNR with geometry for the single eNB transmission. The second curve 2004 represents the variation of the cumulative distribution function of the SNR with geometry for the transmission modes according to embodiments such as, for example, the SFN transmission. It can be appreciated that at a CDF of 90%, that is, at an outage of 10%, the gain is approximately 53 dB. Such a large gain can compensate for the relatively harsh path-loss that results from using, for example, millimeter wave transmissions.

Referring to FIG. 21, there is shown a graph 2100 depicting the geometry curves for various simulation transmit powers for the cell deployment of FIG. 19, but with a carrier frequency of 30 GHz and a transmit bandwidth of 100 MHz. There are three geometry curves 2102, 2104 and 2106 shown for unicast, or single transmit point, transmissions. It can be appreciated that the various simulation transmit power of 49 dBm, 52 dBm and 55 dBm corresponding to curves 2102, 2104 and 2106 are substantially identical.

In contrast, the geometry curves 2108, 2110 and 2112 for SFN transmission modes according to embodiments provide a 25 dB to 31 dB gain at 10% outage or 90% availability. Again, one skilled in the art will appreciate that such gains can be useful in mitigating the adverse effect of millimeter wave transmissions.

Referring to FIG. 22A, there is shown a view 2200A of multiple macro cell and small cell deployments according to a scenario, which is known as small cell scenario 2a taken from 3GPP TR 36.872, v12.1.0 (December 2013). One skilled in the art will appreciate that the deployment of FIG. 22A comprises a plurality of macro-cells 1 to 7, each illustrated as having three sectors. The macro-cells 1 to 7 overlay a plurality of small cell clusters 2202A to 2242A. In the illustrated example, each macro-cell comprises on average three small cells per cluster. In the small cell scenario 2a, the macro-cells use respective frequencies F1 and the small cells use respective frequencies F2, that is, separate frequency deployments are used.

Figure 22B:
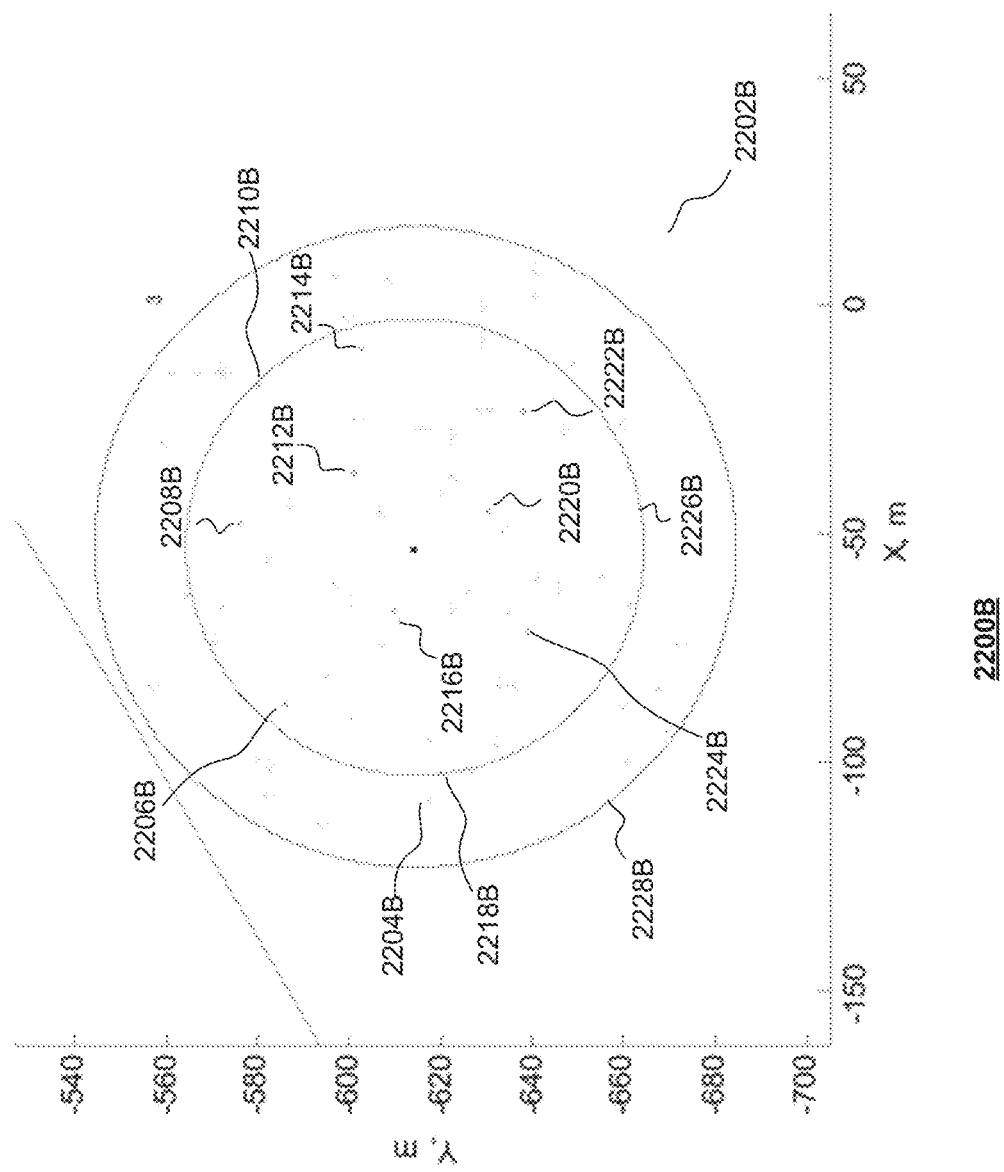

FIG. 22B shows a closer view 2200B view of a coverage or service area of one of the small cells of a small cell cluster 2202B. Within that coverage area, various points are marked as blue stars, which correspond to simulated positions of UEs distributed within the small cell cluster, an example of which is a first UE 2204B. In the simulation, the simulated positions are known as dropped UEs. It can be appreciated that small cells 2206B to 2224B are also distributed throughout the small cell cluster 2202B. The small cells 22026B to 2224B are identified by green dots, which correspond to simulated positions of small cells of the small cell cluster. In the simulation the small cells are known as dropped small cells. There is also shown an inner (red) ring 2226B and an outer (blue) ring 2228B showing different ranges for small cell dropping and UE dropping, respectively. The red circle 2226B defines a macro-cell 2202B, operably using first frequency, F1, which can be, for example, 2 GHz. The second circle 2210 defines a second region of coverage serviced by the small cells at a respective frequency, F2, which can be, for example, a millimeter wave frequency such as 30 GHz.

Figure 23:
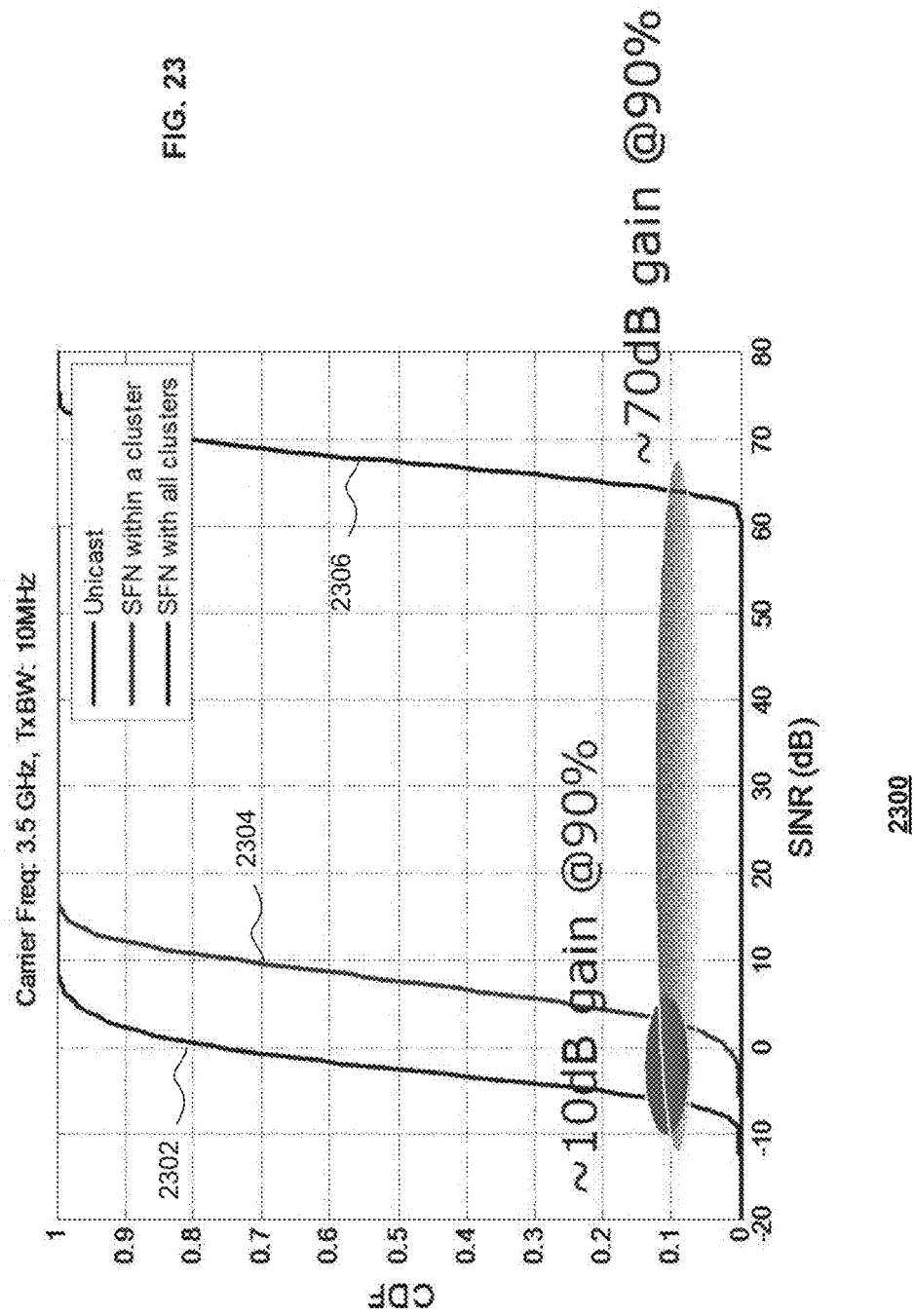
FIG. 23 illustrates geometry curves for yet a further simulation at GHz frequencies.

FIG. 23 is a graph 2300 showing the variation of CDF with geometry for the unicast and SFN transmissions modes; the latter being according to embodiments. The carrier frequency was 3.5 GHz and the transmission bandwidth was 10 MHz. A first curve 2302 shows the variation of CDF with geometry for a unicast mode of transmission. A second curve 2304 is the CDF variation with geometry for the SFN transmission mode, that is, for single frequency network transmissions by small cells within a cluster such as the right-hand side of FIG. 22. A third curve 2306 shows the variation of CDF with geometry for single frequency network transmission by all small cells across all clusters. It can be appreciated that this results in a significant gain, which can compensate for the path loss ordinarily encountered at millimeter wave frequencies.

The second curve 2304 represents the variation in CDF with geometry for SFN transmissions according to embodiments. The small cells within a given cluster are arranged to all transmit the same signal using the same resource elements at the same time. The user equipment processes the resulting plurality of signals as multipath instances of the same signal. It can be appreciated that using such an SFN transmission mode for all small cells within a cluster results in a 10 dB gain.

The third curve 2306 represents the variation in CDF with geometry for transmissions according to embodiments. In the simulation, all small cells within all clusters were arranged to transmit the same signal using the same resource elements at the same time. It can be appreciated that the resulting gain is significant at 70 dB for 10% outage.

FIG. 24 is a graph 2400 showing the variation of CDF with geometry for the unicast and SFN transmissions modes; the latter being according to embodiments. The carrier frequency was 30 GHz and the transmission bandwidth was 1 GHz. A first curve 2402 is the CDF variation with geometry for the unicast mode, that is, for single transmissions by a single small cell within a cluster. A second curve 2404 shows the performance achievable using by small cells using SFN within a cluster. A third curve 2406 shows the performance that can be realised by using SFN by all small cells across a cluster.

The second curve 2404 represents the variation in CDF with geometry for SFN transmissions according to embodiments. The small cells within a given cluster are arranged to all transmit the same signal using the same resource elements at the same time. The user equipment processes the resulting plurality of signals as multipath instances of the same signal. It can be appreciated that using such an SFN transmission mode for all small cells within a cluster results in a 10 dB gain.

The third curve 2406 represents the variation in CDF with geometry for transmissions according to embodiments. In the simulation, all small cells within all clusters were arranged to transmit the same signal using the same resource elements at the same time. It can be appreciated that the resulting gain is significant at 30 dB for 10% outage.

The transmission modes according to embodiments can be realised in according to various embodiments, as detailed in (1) and (2) as follows:

(1) The resource (time/frequency) is shared for a first and second modes, and the actual usage is determined by scheduling. In this case, the scheduling information (e.g. DCI) can carry an indication of which mode is used via one or more bits;

(2) The resources are partitioned by FDM, TDM or superposition. In such embodiments, a separate zone for a first and a second mode for FDM and TDM can be defined. For embodiments using FDM, the resources for the first and second mode are partitioned in the frequency domain. For example, the partitioning can take place at the level of a subcarrier, PRB level or at some other level of granularity. Embodiments using TDM can partition resources in the time domain. For example, partitioning can take place at the level of one or more than one OFDM symbol, at the subframe level, at the radio frame level or at the level of some other unit of time. Embodiments using superposition arrange for the SFN transmissions to be super-positioned.

Although the embodiments herein have been described with reference to two resource blocks, embodiments are not limited thereto. Embodiments can be realised in which some other number of resource blocks are used such as, for example, one resource block or more than two resource blocks. The number of resource blocks used, and, more particularly, the population or occupation of the resource elements of those resource blocks influence the radio resources reserved for wireless communication.

In the embodiments described herein, the subcarriers have frequencies that correspond to an unlicensed frequency band, that is, to a spectrum that has not be licensed for use by a wireless cellular communication system such as, for example, any of the spectra used for LTE and LTE-A or other LTE-derived standard taken jointly and severally in any and all permutations. However, embodiments are not limited thereto. Embodiments can be realised in which the subcarriers can comprise frequencies that selectably correspond to unlicensed frequencies and licensed frequencies or at least one of unlicensed and licensed frequencies.

In various embodiments, the UE and/or the eNB may include a plurality of antennas to implement a multiple-input-multiple-output (MIMO) transmission system, which may operate in a variety of MIMO modes, including single-user MIMO (SU-MIMO), multi-user MIMO (MU-MIMO), closed loop MIMO, open loop MIMO or variations of smart antenna processing. The UE may provide some type of channel state information (CSI) feedback to the eNB via one or more up link channels, and the eNB may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

In various embodiments, the UE may transmit CSI feedback to the eNB. The CSI feedback may include information related to channel quality index (CQI), precoding matrix indicator (PMI), and rank indication (RI). PMI may reference, or otherwise uniquely identify, a precoder within the codebook. The eNB may adjust the downlink channel based on the precoder referenced by the PMI.

The components and features of the above eNBs and UEs may be implemented using any combination of discrete circuitry, application specific integrated circuits (ASICs), logic gates and/or single chip architectures. Further, the features of UE may be implemented using microcontrollers, programmable logic arrays and/or microprocessors or any combination of the foregoing where suitably appropriate. It is noted that hardware, firmware and/or software elements may be collectively or individually referred to as "logic" or "circuit".

The various embodiments may be used in a variety of applications including transmitters and receivers of a radio system, although the embodiments are not limited in this respect. Radio systems specifically included within the scope of the present invention include, but are not limited to, network interface cards (NICs), network adaptors, fixed or mobile client devices, relays, eNodeB or transmit points, femtocells, gateways, bridges, hubs, routers, access points, or other network devices. Further, the radio systems within the scope of the embodiments may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

The embodiments herein have been described within the context of using millimeter wave frequencies or one or more than one millimeter wave frequency band for the unlicensed spectrum or spectra. However, embodiments are not limited to such frequencies. Embodiments can be realised in which other frequencies or frequency bands can be used.

Embodiments described herein show the smaller cells as being overlaid on a macro-cell. However, embodiments are not limited thereto. Any and all embodiments can be realised in which the smaller cells are operable without being overlaid on a macro-cell or any other cell.

It will be appreciated that embodiments can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or machine readable storage such as, for example, DVD, memory stick or solid state medium. It will be appreciated that the storage devices and storage media are embodiments of non-transitory machine-readable storage that are suitable for storing a program or programs comprising instructions that, when executed, implement embodiments described and claimed herein. Accordingly, embodiments provide machine executable code for implementing a system, apparatus, eNB, MME, UE, device or method as described herein or as claimed herein and machine readable storage storing such a program. Still further, such programs may be conveyed electronically via any medium such as a communication signal carried over a wired or wireless connection and embodiments suitably encompass the same.

Although various embodiments have been described herein, many variations and modifications are possible without departing from the scope of the invention. Accordingly the inventive embodiments are not limited by the specific disclosure above, but rather only by the scope of the appended claims and their legal equivalents.

The embodiments described herein refer to using, such as, for example, transmitting, the same radio resources at the same time or to transmitting or otherwise using the same radio resources simultaneously. In both instances, the embodiments are not intended to require precise temporal alignment of the use of the radio resources or precise temporal alignment of the radio resource per se. The same radio resources used at the same time or the same radio resources used simultaneously are, in embodiments, sufficiently temporally aligned to allow signals carried by those radio resources to be treated and processed as multipath instances of a single transmission.

Embodiments are also provided according to the following clauses:

Clause 1. An eNB for communicating with a UE, the eNB comprising
processing circuitry configured to
establish a first communication mode using a first set of radio resources;
determine that the first communication mode does not meet at least one performance criterion; and
switch to a second communication mode using a second set of radio resources to carry one or more than one signal to the UE; the second set of radio resources also simultaneously being used by a plurality of other eNBs to carry the same one or more than one signal to the UE.

Clause 2. The eNB of clause 1, further comprising processing circuitry to transmit control information, associated with the UE, to instruct the UE to switch to the second communication mode.

Clause 3. The eNB of clause 2, wherein the control information is Downlink Control Information.

Clause 4. The eNB of any of clauses 1 to 3, wherein the processing circuitry configured to establish the first communication mode comprises processing circuitry configured to use beam-forming with radio resources of the first set of radio resources associated with a first range of frequencies.

Clause 5. The eNB of clause 4, wherein the first range of frequencies comprises millimeter wave frequencies.

Clause 6. The eNB of any of clauses 1 to 5, wherein said processing circuitry configured to switch to a second communication mode using the second set of radio resources comprises processing circuitry configured to use radio resources associated with a second range of frequencies.

Clause 7. The eNB of clause 6, wherein the second range of frequencies comprises millimeter wave frequencies.

Clause 8. The eNB of clause 6, wherein the second range of frequencies comprises MHz frequencies.

Clause 9. The eNB of any of clauses 1 to 8, wherein the first set of radio resources comprises a first set of subcarriers.

Clause 10. The eNB of any of clauses 1 to 9, wherein the first set of radio resources comprises a first set of symbols.

Clause 11. The eNB of clause 10, wherein the first set of symbols comprises a first set of OFDM symbols.

Clause 12. The eNB of any of clauses 1 to 11, wherein the second set of radio resources comprises a second set of subcarriers.

Clause 13. The eNB of any of clauses 1 to 12, wherein the second set of radio resources comprises a second set of symbols.

Clause 14. The eNB of clause 13, wherein the second set of symbols comprises a second set of OFDM symbols.

Clause 15. The eNB of any of clauses 1 to 14, further comprising processing circuitry configured to simultaneously transmit the one or more than one signal to the UE using both the first communication mode and the second communication mode.

Clause 16. The eNB of any of clauses 1 to 15, wherein the first and the second communication modes are based on beamforming and non-beamforming transmissions, respectively.

Clause 17. The eNB of any of clauses 1 to 15, wherein the first and the second communication modes are based on non-beamforming and beamforming transmissions, respectively.

Clause 18. The eNB of any of clauses 1 to 17, wherein one or more portions of the first set of radio resources are shared with one or more portions of the second set of radio resources.

Clause 19. The eNB of any of clauses 1 to 17, wherein the first set of radio resources is identical to the second set of radio resources.

Clause 20. A user equipment for processing wireless signals; the user equipment comprising
a receiver for receiving a plurality of wireless signals from a plurality of eNBs or other transmitters; the plurality of wireless signals each bearing the same data designated for, or to be received by, the user equipment;
a signal processor configured to process the received signals; the signal processor comprising
a multipath processing module configured to process at least two or more wireless signals of the received plurality of wireless signals as multipath instances of a single signal to construct a representation of the data designated for, or to be received by, the UE carried by the plurality of wireless signals.

Clause 21. The user equipment of clause 20, wherein the plurality of received signals forms part of a single frequency network transmission of the same data to, or to be received by, the user equipment.

Clause 22. The user equipment of either of clauses 20 and 21, wherein the multipath processing module is arranged to process the at least two or more wireless signals of the plurality of received signals according to selected transmission time intervals containing the same data.

Clause 23. The user equipment of any of clauses 20 to 22, wherein the multipath processing module is arranged to process the at least two or more wireless signals of the plurality of received signals according to multiple instances of the same data within a common transmission time interval.

Clause 24. The user equipment of any of clauses 20 to 23, wherein the multipath processing module is arranged to process the at least two or more wireless signals of the multiple instances of the same data contained within respective transmission time intervals.

Clause 25. The user equipment of any of clauses 20 to 24, wherein the plurality of wireless signals bearing the same data comprises data representing at least one reference signal.

Clause 26. The user equipment of any of clauses 20 to 25, wherein the plurality of wireless signals bearing the same data comprises at least one of a Primary Synchronisation Signal and a Secondary Synchronisation Signal.

Clause 27. The user equipment of any of clauses 20 to 26, further comprising at least one or more than one of a screen, an antenna, a microphone, a speaker, an input device and an output device.

Clause 28. A method of wireless communication, the method comprising receiving, at a receiver, a number of instances of a data bearing transmit signal transmitted from a number of transmitters; the number of transmitters being part of a single frequency network using the same radio resources at the same time to transmit the same data;

demodulating a plurality of the received instances of the data bearing transmit signals;

processing two or more of the demodulated received instances of the data bearing transmit signals to recover the data; the processing comprising processing said two or more of the demodulated received instances of data bearing transmit signals as multipath signals of a single transmit signal bearing the data.

Clause 29. The method of clause 28, further comprising generating, from at least part of the recovered data, feedback data; the feedback data being associated with a channel between at least one antenna of at least one of the transmitters and at least one antenna of the receiver.

Clause 30. The method of clause 29, wherein said generating feedback data comprises producing adaptive antenna mapping data associated with influencing at least one of signal transmission and interference.

Clause 31. The method of clause 30, in which said producing adaptive antenna mapping data associated with influencing at least one of signal transmission and interference comprises producing data associated with at least reducing signal cancellation, at the receiver, interference of the number of received instances of the data bearing transmit signals.

Clause 32. The method of any of clauses 29 to 31, wherein the feedback data comprises at least one of a precoding matrix indicator and a rank indicator.

Clause 33. The method of any of clauses 28 to 32, wherein the at least part of the recovered data comprises at least one of a reference signal and a preamble.

Clause 34. A method of accessing a wireless network, the method comprising arranging for at least one synchronisation signal to be transmitted by a plurality of eNBs using the same radio resources at the same time;

transmitting multiple instances of the at least one synchronisation signal from respective eNBs of the plurality of eNBs; the multiple instances of the at least one synchronisation signal being arranged to be carried using the same radio resources at the same time; and receiving, at at least one of the plurality of eNBs, an access request from a user equipment having processed the at least one synchronisation signal.

Clause 35. The method of clause 34, wherein said transmitting multiple instances of the at least one synchronisation signal from the respective eNBs comprises transmitting multiple instances of at least one of a Primary Synchronisation Signal (PSS) and a Secondary Synchronisation Signal (SSS).

Clause 36. The method of clause 35, wherein the at least one synchronisation signal comprises at least a further signal associated with at least one of a Physical Layer Cell ID, a slot boundary and data associated with at least one of a further ID and a frame structure.

Clause 37. The method of clause 36, wherein the at least one further ID comprises a Group Cell ID.

Clause 38. An eNB for supporting wireless communication with a user equipment (UE); the eNB comprising at least a processor configured to control the output of at least one common signal to be transmitted by a plurality of associated eNBs using the same radio resources at the same time; said eNB being one of the plurality of eNBs arranged to form a Single Frequency Network;

a transmitter, responsive to the control of the processor, to transmit at least one instance of the common signal using the same radio resources simultaneously as the radio resources used by the plurality of eNBs to transmit respective instances of the at least one common signal; and said processor being further configured to receive, in response to the at least one instance of the common signal, a user equipment request for radio resource to support said wireless communication.

Clause 39. The eNB of clause 38, wherein the at least one common signal comprises one or more than one instance of at least one of a Primary Synchronisation Signal (PSS) and a Secondary Synchronisation Signal (SSS).

Clause 40. The eNB of clause 39, wherein the at least one common signal comprises at least one of a Physical Layer Cell ID, one or more than one slot boundary, and data associated with at least one of a further ID and a frame structure.

Clause 41. The eNB of clause 40, wherein the at least one further ID comprises a Group Cell ID.

Clause 42. An eNB for communication with a UE, the eNB comprising a processor configured to:

assess channel conditions of a channel between the UE and the eNB, the channel being associated with at least a first carrier within a first range of frequencies;

detect that channel conditions of the channel between the UE and the eNB are adverse channel conditions; and transmit, in response to said adverse channel conditions, data designated for, or to be received by, the UE using prescribed radio resources; the prescribed radio resources being common to a plurality of eNBs also configured to transmit the same data designated for, or to be received by, the UE using the same prescribed radio resources at the same time.

Clause 43. The eNB of clause 41, wherein the first range of frequencies comprises millimeter wave frequencies.

Clause 44. An apparatus for controlling transmissions to a user equipment (UE), the apparatus comprising a processor configured to:

process data associated with channel conditions of a channel between the user equipment and an eNB; the channel being associated with one or more than one frequency of a first range of frequencies, determine that multiple instances of one or more than one signal designated for, or to be received by, the UE should be transmitted to the UE using the same radio resources at the same time; the radio resources comprising radio elements associated with one or more than one frequency selected from the first range of frequencies, and arrange for the multiple instances of the one or more than one signal designated for, or to be received by, the UE to be transmitted to the UE using the same radio resources at the same time.

Clause 45. The apparatus of clause 44, in which the first range of frequencies comprises millimeter wave frequencies.

Clause 46. A method of providing user equipment (UE) access to a wireless network; the method comprising assessing a channel condition of one or more than one channel associated with radio resources having frequencies within a first frequency range;

transmitting, in response to said assessing, multiple instances of one or more than one signal to be received by the UE.

Clause 47. The method of clause 46, wherein said transmitting, in response to said assessing, multiple instances of one or more than one signal to be received by the UE comprises at least one or more of:

transmitting the multiple instances of the one or more than one signal to be received by the UE as temporally synchronised signals;

transmitting the multiple instances of the one or more than one signal to be received by the UE using the same radio elements or as frequency synchronised signals;

transmitting the multiple instances of the one or more than one signal to be received by the UE from a single eNB using respective radio resources;

transmitting the multiple instances of the one or more than one signal to be received by the UE from a plurality of eNBs using the same radio resources simultaneously.

Clause 48. The method of either of clauses 46 and 47, comprising receiving data associated with an access process (PRACH) from the UE; and engaging in said access process, in response to said receiving, to provide the UE with access to the wireless network.

Clause 49. The method of clause 48, wherein said engaging comprises performing a PRACH procedure.

Clause 50. The method of any of clauses 46 to 49, wherein the first frequency range comprises millimeter wave frequencies.

Clause 51. A method of communicating with a UE, the method comprising establishing a first communication mode using a first set of radio resources;

determining that the first communication mode does not meet at least one performance criterion; and switching to a second communication mode using a second set of radio resources to carry one or more than one signal to the UE; the second set of radio resources also simultaneously being used by a plurality of transmitters to carry the same one or more than one signal to the UE.

Clause 52. The method of clause 51, further comprising transmitting control information, associated with the UE, to instruct the UE to switch to the second communication mode.

Clause 53. The method of clause 52, wherein the control information is Downlink Control Information.

Clause 54. The method of any of clauses 51 to 53, wherein establishing the first communication mode comprises using beam-forming with radio resources of the first set of radio resources associated with a first range of frequencies.

Clause 55. The method of clause 54, wherein the first range of frequencies comprises millimeter wave frequencies.

Clause 56. The method of any of clauses 51 to 55, wherein said switching to a second communication mode using the second set of radio resources comprises using radio resources associated with a second range of frequencies.

Clause 57. The method of clause 56, wherein the second range of frequencies comprises millimeter wave frequencies.

Clause 58. The method of clause 56, wherein the second range of frequencies comprises MHz frequencies.

Clause 59. The method of any of clauses 51 to 58, wherein the first set of radio resources comprises a first set of subcarriers.

Clause 60. The method of any of clauses 51 to 59, wherein the first set of radio resources comprises a first set of symbols.

Clause 61. The method of clause 60, wherein the first set of symbols comprises a first set of OFDM symbols.

Clause 62. The method of any of clauses 51 to 61, wherein the second set of radio resources comprises a second set of subcarriers.

Clause 63. The method of any of clauses 51 to 62, wherein the second set of radio resources comprises a second set of symbols.

Clause 64. The method of clause 63, wherein the second set of symbols comprises a second set of OFDM symbols.

Clause 65. The method of any of clauses 51 to 64, further comprising simultaneously transmitting the one or more than one signal to the UE using both the first communication mode and the second communication mode.

Clause 66. The method of any of clauses 51 to 65, wherein the first and the second communication modes are based on beamforming and non-beamforming transmissions, respectively.

Clause 67. The method of any of clauses 51 to 65, wherein the first and the second communication modes are based on non-beamforming and beamforming transmissions, respectively.

Clause 68. The method of any of clauses 51 to 67, wherein one or more portions of the first set of radio resources are shared with one or more portions of the second set of radio resources.

Clause 69. The method of any of clauses 51 to 67, wherein the first set of radio resources is identical to the second set of radio resources.

Clause 70. A system comprising means to implement a method of any of clauses 28 to 37 or any of clauses 46 to 69.

Clause 71. A system of communicating with a UE, the system comprising means for implementing a method as expressed in any of clauses 28 to 37 or clauses 46 to 69.

Clause 72. The system of clause 71, further comprising means for transmitting control information, associated with the UE, to instruct the UE to switch to the second communication mode.

Clause 73. The system of clause 72, wherein the control information is Downlink Control Information.

Clause 74. The system of any of clauses 71 to 73, wherein the means for establishing the first communication mode comprises means for using beam-forming with radio resources of the first set of radio resources associated with a first range of frequencies.

Clause 75. The system of clause 74, wherein the first range of frequencies comprises millimeter wave frequencies.

Clause 76. The system of any of clauses 71 to 75, wherein said means for switching to a second communication mode using the second set of radio resources comprises means for using radio resources associated with a second range of frequencies.

Clause 77. The system of clause 76, wherein the second range of frequencies comprises millimeter wave frequencies.

Clause 78. The system of clause 76, wherein the second range of frequencies comprises MHz frequencies.

Clause 79. The system of any of clauses 71 to 78, wherein the first set of radio resources comprises a first set of subcarriers.

Clause 80. The system of any of clauses 71 to 79, wherein the first set of radio resources comprises a first set of symbols.

Clause 81. The system of clause 80, wherein the first set of symbols comprises a first set of OFDM symbols.

Clause 82. The system of any of clauses 71 to 81, wherein the second set of radio resources comprises a second set of subcarriers.

Clause 83. The system of any of clauses 71 to 82, wherein the second set of radio resources comprises a second set of symbols.

Clause 84. The system of clause 83, wherein the second set of symbols comprises a second set of OFDM symbols.

Clause 85. The system of any of clauses 71 to 84, further comprising means for simultaneously transmitting the one or more than one signal to the UE using both the first communication mode and the second communication mode.

Clause 86. The system of any of clauses 71 to 85, wherein the first and the second communication modes are based on beamforming and non-beamforming transmissions, respectively.

Clause 87. The system of any of clauses 71 to 85, wherein the first and the second communication modes are based on non-beamforming and beamforming transmissions, respectively.

Clause 88. The system of any of clauses 71 to 87, wherein one or more portions of the first set of radio resources are shared with one or more portions of the second set of radio resources.

Clause 89. The system of any of clauses 71 to 87, wherein the first set of radio resources is identical to the second set of radio resources.

Clause 90. A machine executable program comprising instructions arranged, when executed, to cause a machine to perform the method of any of clauses 28 to 37 or clauses 46 to 69.

Clause 91. Machine readable storage, preferably non-transitory machine readable storage, storing a computer program of clause 90.

What is claimed is:

1. An eNB for communicating with a user equipment (UE), the eNB comprising:
    processing circuitry to:
        establish a first communication mode to communicate with the UE using a first set of radio resources;
        determine that the first communication mode does not meet at least one performance criterion; and
        switch to a second communication mode using a second set of radio resources to carry one or more than one signal from the eNB to the UE; the second set of radio resources to simultaneously be used by a plurality of other eNBs to carry the same one or more than one signal to the UE in a single frequency network (SFN), at least one of the plurality of other eNBs being geographically separated from the eNB, wherein the second communication mode is based on non-beamformed transmissions; and
    a transmitter, coupled with the processing circuitry, to transmit downlink control information (DCI) to the UE to instruct the UE to switch to the second communication mode,
    wherein the processing circuitry is to utilize the second communication mode to transmit control signals to facilitate initial access for the UE, said control signals to include one or more synchronisation signals, broadcast channel signals, or system information block signals, and the processing circuitry is to utilize the first communication mode to communicate with the UE after the initial access.

2. The eNB of claim 1, wherein the processing circuitry is to use beam-forming with radio resources of the first set of radio resources associated with a first range of frequencies in the first communication mode.

3. The eNB of claim 2, wherein the first range of frequencies comprises millimeter wave frequencies.

4. The eNB of claim 2, wherein to use the second set of radio resources said processing circuitry is to use radio resources associated with a second range of frequencies.

5. The eNB of claim 4, wherein the second range of frequencies comprises millimeter wave frequencies.

6. The eNB of claim 4, wherein the second range of frequencies comprises MHz frequencies.

7. The eNB of claim 1, wherein the processing circuitry is to simultaneously transmit the one or more than one signal to the UE using both the first communication mode and the second communication mode.

8. The eNB of claim 1, wherein the first communication mode is based on beamforming transmissions.

9. The eNB of claim 1, wherein one or more portions of the first set of radio resources are shared with one or more portions of the second set of radio resources.

10. The eNB of claim 1, wherein the first set of radio resources is identical to the second set of radio resources.

11. A user equipment for processing wireless signals; the user equipment comprising:
    a receiver to receive, in a first communication mode, a plurality of wireless signals from a plurality of geographically distributed eNBs or other transmitters of a single frequency network (SFN), each of the plurality of wireless signals to bear same data designated for, or to be received by, the user equipment, wherein the first communication mode is based on non-beamformed transmissions;
    a signal processor to process the received signals, the signal processor to process at least two or more wireless signals of the received plurality of wireless signals as multipath instances of a single signal to construct a representation of the data designated for, or to be received by, the UE carried by the plurality of wireless signals,
    wherein the receiver is further to receive downlink control information (DCI) and the signal processor is further to switch to a second communication mode based on the DCI to process a beamformed signal transmitted to the UE from an eNB of the plurality of eNBs,
    wherein the two or more wireless signals include control signals to facilitate initial access for the user equipment, said control signals to include one or more synchronisation signals, broadcast channel signals, or system information block signals, and the signal processor is to switch to the second communication mode after the initial access.

12. The user equipment of claim 11, wherein the plurality of wireless signals bearing the same data comprises data representing at least one or more than one of at least one reference signal, at least one of a Primary Synchronisation Signal and a Secondary Synchronisation Signal.

13. The user equipment claim 11, further comprising at least one or more than one of a screen, an antenna, a microphone, a speaker, an input device and an output device.

* * * * *